United States Patent
Obata et al.

(10) Patent No.: US 7,603,616 B2
(45) Date of Patent: *Oct. 13, 2009

(54) PROXY SERVER USING A STATISTICAL MODEL

(75) Inventors: Kenji Obata, Seattle, WA (US); Dmitriy Meyerzon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/981,962

(22) Filed: Nov. 5, 2004

(65) Prior Publication Data

US 2005/0086583 A1   Apr. 21, 2005

Related U.S. Application Data

(63) Continuation of application No. 09/603,695, filed on Jun. 26, 2000, now Pat. No. 6,883,135.

(51) Int. Cl.
*G06F 17/30* (2006.01)

(52) U.S. Cl. ............... 715/205; 715/200; 715/255; 707/1; 707/3; 707/10; 709/217

(58) Field of Classification Search ........... 715/500, 715/513, 511, 205, 200, 255; 707/1, 3, 200, 707/5, 10; 709/217, 219, 203; 711/100
See application file for complete search history.

(56) References Cited

U.S. PATENT DOCUMENTS

| | | | |
|---|---|---|---|
| 5,222,236 A | 6/1993 | Potash et al. | 707/102 |
| 5,257,577 A | 11/1993 | Clark | 100/99 |
| 5,594,660 A | 1/1997 | Sung et al. | 715/500.1 |
| 5,606,609 A | 2/1997 | Houser et al. | 713/179 |
| 5,848,404 A | 12/1998 | Hafner et al. | 707/3 |
| 5,893,092 A | 4/1999 | Driscoll | 707/5 |

(Continued)

FOREIGN PATENT DOCUMENTS

DE    10029644 A1    1/2002

(Continued)

OTHER PUBLICATIONS

Brin, S. et al., "The Anatomy of a Large-Scale Hypertextual Web Search Engine", Proceedings of the Seventh International World-Wide Web Conference, 'Online! Apr. 14, 1998, pp. 1-26.

(Continued)

*Primary Examiner*—Adam L Basehoar
(74) *Attorney, Agent, or Firm*—Merchant & Gould, P.C.

(57) ABSTRACT

A computer based system and method of determining whether to re-fetch a previously retrieved document across a computer network is disclosed. The method utilizes a statistical model to determine whether the previously retrieved document likely changed since last accessed. The statistical model is continuously improving its accuracy by training internal probability distributions to reflect the actual experience with change rate patterns of the documents accessed. The decision of whether to access the document is based on the probability of change compared against a desired synchronization level, random selections, maximum limits on the amount of time since the document was last accessed, and other criterion. Once the decision to access is made, the document is checked for changes and this information is used to train the statistical model.

21 Claims, 18 Drawing Sheets

U.S. PATENT DOCUMENTS

| | | | |
|---|---|---|---|
| 5,920,859 A | 7/1999 | Li | 707/5 |
| 5,933,851 A | 8/1999 | Kojima et al. | 711/133 |
| 5,960,383 A | 9/1999 | Fleischer | 704/9 |
| 5,983,216 A | 11/1999 | Kirsch et al. | 707/9 |
| 5,987,457 A | 11/1999 | Ballard | 707/5 |
| 6,006,225 A | 12/1999 | Bowman et al. | 707/5 |
| 6,012,053 A | 1/2000 | Pant et al. | 707/3 |
| 6,032,196 A | 2/2000 | Monier | 709/245 |
| 6,041,323 A | 3/2000 | Kubota | 707/5 |
| 6,070,158 A | 5/2000 | Kirsch et al. | 707/3 |
| 6,070,191 A | 5/2000 | Narendran et al. | 709/226 |
| 6,098,064 A * | 8/2000 | Pirolli et al. | 707/2 |
| 6,125,361 A | 9/2000 | Chakrabarti et al. | 707/3 |
| 6,128,701 A * | 10/2000 | Malcolm et al. | 711/133 |
| 6,145,003 A | 11/2000 | Sanu et al. | 709/225 |
| 6,151,624 A | 11/2000 | Teare et al. | 709/217 |
| 6,167,369 A | 12/2000 | Schulze | 704/9 |
| 6,182,085 B1 | 1/2001 | Eischstaedt et al. | 707/104.1 |
| 6,182,113 B1 | 1/2001 | Narayanaswami | 709/203 |
| 6,185,558 B1 | 2/2001 | Bowman et al. | 707/5 |
| 6,202,058 B1 | 3/2001 | Rose et al. | 706/45 |
| 6,208,988 B1 | 3/2001 | Schultz | 707/5 |
| 6,222,559 B1 | 4/2001 | Asano et al. | 345/440 |
| 6,240,407 B1 | 5/2001 | Chang et al. | 707/2 |
| 6,240,408 B1 | 5/2001 | Kaufman | 707/3 |
| 6,247,013 B1 | 6/2001 | Morimoto | 707/10 |
| 6,263,364 B1 | 7/2001 | Najork et al. | 709/217 |
| 6,285,367 B1 | 9/2001 | Abrams et al. | 345/357 |
| 6,285,999 B1 | 9/2001 | Page | 707/5 |
| 6,304,864 B1 | 10/2001 | Liddy et al. | 706/15 |
| 6,317,741 B1 | 11/2001 | Burrows | 707/5 |
| 6,327,590 B1 | 12/2001 | Chidlovskii | 707/5 |
| 6,349,308 B1 | 2/2002 | Whang et al. | 707/107 |
| 6,351,467 B1 | 2/2002 | Dillon | 370/432 |
| 6,351,755 B1 | 2/2002 | Najork et al. | 707/501.1 |
| 6,360,215 B1 | 3/2002 | Judd et al. | 707/3 |
| 6,385,602 B1 | 5/2002 | Tso et al. | 707/3 |
| 6,389,436 B1 * | 5/2002 | Chakrabarti et al. | 715/513 |
| 6,418,433 B1 | 7/2002 | Chakrabarti et al. | 707/5 |
| 6,418,452 B1 * | 7/2002 | Kraft et al. | 707/200 |
| 6,418,453 B1 * | 7/2002 | Kraft et al. | 707/200 |
| 6,442,606 B1 | 8/2002 | Subbaroyan et al. | 709/224 |
| 6,484,204 B1 | 11/2002 | Rabinovich | 709/226 |
| 6,516,312 B1 | 2/2003 | Kraft et al. | 707/3 |
| 6,539,376 B1 | 3/2003 | Sundaresan et al. | 707/5 |
| 6,546,388 B1 | 4/2003 | Edlund et al. | 707/5 |
| 6,547,829 B1 | 4/2003 | Meyerzon et al. | 715/501.1 |
| 6,549,897 B1 | 4/2003 | Katariya et al. | 707/5 |
| 6,594,682 B2 | 7/2003 | Peterson et al. | 718/102 |
| 6,598,047 B1 | 7/2003 | Russell et al. | 707/5 |
| 6,598,051 B1 | 7/2003 | Wiener et al. | 707/100 |
| 6,601,075 B1 | 7/2003 | Huang et al. | 707/104.1 |
| 6,622,140 B1 | 9/2003 | Kantrowitz | 707/5 |
| 6,628,304 B2 | 9/2003 | Mitchell et al. | 345/734 |
| 6,633,867 B1 | 10/2003 | Kraft et al. | 707/3 |
| 6,633,868 B1 | 10/2003 | Min | 707/3 |
| 6,636,853 B1 | 10/2003 | Stephens | 707/10 |
| 6,638,314 B1 | 10/2003 | Meyerzon et al. | 715/234 |
| 6,671,683 B2 | 12/2003 | Kanno | 707/5 |
| 6,701,318 B2 | 3/2004 | Fox et al. | 707/10 |
| 6,718,324 B2 | 4/2004 | Edlund et al. | 707/5 |
| 6,718,365 B1 | 4/2004 | Dutta | 709/203 |
| 6,738,764 B2 | 5/2004 | Mao et al. | 707/5 |
| 6,763,362 B2 | 7/2004 | McKeeth | 707/104.1 |
| 6,766,316 B2 | 7/2004 | Caudill et al. | 707/3 |
| 6,766,422 B2 * | 7/2004 | Beyda | 711/137 |
| 6,775,659 B2 | 8/2004 | Clifton-Bligh | 707/1 |
| 6,775,664 B2 | 8/2004 | Lang et al. | 707/3 |
| 6,778,997 B2 | 8/2004 | Sundaresan et al. | 707/104.1 |
| 6,829,606 B2 | 12/2004 | Ripley | 707/5 |
| 6,862,710 B1 | 3/2005 | Marchisio | 715/501.1 |
| 6,871,202 B2 | 3/2005 | Broder | 707/7 |
| 6,886,010 B2 | 4/2005 | Kostoff | 707/3 |
| 6,886,129 B1 | 4/2005 | Raghavan et al. | 715/501.1 |
| 6,910,029 B1 | 6/2005 | Sundaresan | 707/2 |
| 6,931,397 B1 | 8/2005 | Sundaresan | 707/5 |
| 6,934,714 B2 | 8/2005 | Meinig | 707/102 |
| 6,944,609 B2 | 9/2005 | Witbrock | 707/3 |
| 6,947,930 B2 | 9/2005 | Anick et al. | 707/5 |
| 6,959,326 B1 | 10/2005 | Day et al. | 709/217 |
| 6,973,490 B1 * | 12/2005 | Robertson et al. | 709/224 |
| 6,990,628 B1 | 1/2006 | Palmer et al. | 707/501 |
| 7,016,540 B1 | 3/2006 | Gong et al. | 382/225 |
| 7,028,029 B2 | 4/2006 | Kamvar et al. | 707/5 |
| 7,051,023 B2 | 5/2006 | Kapur et al. | 707/5 |
| 7,072,888 B1 | 7/2006 | Perkins | 707/10 |
| 7,076,483 B2 | 7/2006 | Preda et al. | 707/5 |
| 7,080,073 B1 | 7/2006 | Jiang et al. | 707/7 |
| 7,107,218 B1 | 9/2006 | Preston | 704/270 |
| 7,152,059 B2 | 12/2006 | Monteverde | 707/3 |
| 7,181,438 B1 | 2/2007 | Szabo | 707/2 |
| 7,197,497 B2 | 3/2007 | Cossock | 707/7 |
| 7,228,301 B2 | 6/2007 | Meyerzon | 707/3 |
| 7,243,102 B1 | 7/2007 | Naam et al. | 707/7 |
| 7,246,128 B2 | 7/2007 | Jordahl | 707/100 |
| 7,257,577 B2 | 8/2007 | Fagin et al. | 707/7 |
| 7,260,573 B1 | 8/2007 | Jeh et al. | 707/7 |
| 7,281,002 B2 | 10/2007 | Farrell | 707/3 |
| 7,308,643 B1 | 12/2007 | Zhu et al. | 715/206 |
| 7,328,401 B2 | 2/2008 | Obata et al. | 707/3 |
| 7,428,530 B2 | 9/2008 | Ramarathnam et al. | 707/3 |
| 2001/0042076 A1 | 11/2001 | Fukuda | 707/500 |
| 2002/0055940 A1 | 5/2002 | Elkan | 707/104.1 |
| 2002/0062323 A1 | 5/2002 | Takatori et al. | 707/514 |
| 2002/0078045 A1 | 6/2002 | Dutta | 707/7 |
| 2002/0099694 A1 | 7/2002 | Diamond et al. | 707/3 |
| 2002/0103798 A1 | 8/2002 | Abrol et al. | 707/5 |
| 2002/0107861 A1 | 8/2002 | Clendinning et al. | 77/101 |
| 2002/0107886 A1 * | 8/2002 | Gentner et al. | 707/511 |
| 2002/0129014 A1 | 9/2002 | Kim et al. | 707/5 |
| 2002/0169595 A1 | 11/2002 | Agichtein et al. | 704/9 |
| 2002/0169770 A1 | 11/2002 | Kim et al. | 707/5 |
| 2003/0037074 A1 | 2/2003 | Dwork et al. | 707/500 |
| 2003/0061201 A1 | 3/2003 | Grefenstette et al. | 707/3 |
| 2003/0065706 A1 | 4/2003 | Smyth et al. | 709/200 |
| 2003/0074368 A1 | 4/2003 | Schuetze et al. | 707/103 R |
| 2003/0208482 A1 | 11/2003 | Kim et al. | 707/3 |
| 2003/0217047 A1 | 11/2003 | Marchisio | 707/3 |
| 2003/0217052 A1 | 11/2003 | Rubenczyk et al. | 707/3 |
| 2004/0006559 A1 | 1/2004 | Gange et al. | 707/3 |
| 2004/0049766 A1 | 3/2004 | Bloch et al. | 717/121 |
| 2004/0093328 A1 | 5/2004 | Damle | 707/3 |
| 2004/0117351 A1 | 6/2004 | Challapalli et al. | 707/2 |
| 2004/0148278 A1 | 7/2004 | Milo et al. | 707/3 |
| 2004/0181515 A1 | 9/2004 | Ullman et al. | 707/3 |
| 2004/0186827 A1 | 9/2004 | Anick et al. | 707/3 |
| 2004/0194099 A1 | 9/2004 | Lamping et al. | 718/100 |
| 2004/0199497 A1 | 10/2004 | Timmons | 707/3 |
| 2004/0205497 A1 | 10/2004 | Alexander et al. | 715/501.1 |
| 2004/0215606 A1 | 10/2004 | Cossock | 707/3 |
| 2004/0215664 A1 | 10/2004 | Hennings et al. | 707/104.1 |
| 2004/0254932 A1 | 12/2004 | Gupta et al. | 707/7 |
| 2005/0033742 A1 | 2/2005 | Kamvar et al. | 707/7 |
| 2005/0044071 A1 | 2/2005 | Cho et al. | 707/3 |
| 2005/0055340 A1 | 3/2005 | Dresden | 707/3 |
| 2005/0055347 A9 | 3/2005 | Cho et al. | 707/5 |
| 2005/0060311 A1 | 3/2005 | Tong et al. | 707/1 |
| 2005/0071328 A1 | 3/2005 | Lawrence | 707/3 |
| 2005/0071741 A1 | 3/2005 | Acharya et al. | 715/500 |
| 2005/0086192 A1 * | 4/2005 | Kodama | 707/1 |
| 2005/0086206 A1 * | 4/2005 | Balasubramanian et al. | 707/3 |
| 2005/0086583 A1 | 4/2005 | Obata et al. | 715/229 |
| 2005/0144162 A1 | 6/2005 | Liang | 707/3 |
| 2005/0154746 A1 | 7/2005 | Liu et al. | 707/101 |

| | | | |
|---|---|---|---|
| 2005/0165781 A1 | 7/2005 | Kraft et al. | 707/7 |
| 2005/0187965 A1 | 8/2005 | Abajian | 707/102 |
| 2005/0192936 A1* | 9/2005 | Meek et al. | 707/3 |
| 2005/0192955 A1 | 9/2005 | Farrell | 707/5 |
| 2005/0210006 A1 | 9/2005 | Robertson | 707/3 |
| 2005/0216533 A1 | 9/2005 | Berkhin | 707/204 |
| 2005/0240580 A1 | 10/2005 | Zamir et al. | 707/4 |
| 2005/0251499 A1 | 11/2005 | Huang | 707/1 |
| 2005/0262050 A1 | 11/2005 | Fagin et al. | 707/3 |
| 2006/0036598 A1 | 2/2006 | Wu | 707/5 |
| 2006/0047649 A1 | 3/2006 | Liang | 707/4 |
| 2006/0173560 A1 | 8/2006 | Widrow | 700/48 |
| 2006/0195440 A1 | 8/2006 | Burges et al. | 707/5 |
| 2006/0206460 A1 | 9/2006 | Gadkari et al. | 707/3 |
| 2006/0206476 A1 | 9/2006 | Kapur et al. | 707/5 |
| 2006/0282455 A1 | 12/2006 | Lee et al. | 707/102 |
| 2006/0287993 A1 | 12/2006 | Yao et al. | 707/4 |
| 2007/0038616 A1 | 2/2007 | Guha | 707/4 |
| 2007/0038622 A1 | 2/2007 | Meyerzon et al. | 705/5 |
| 2007/0073748 A1 | 3/2007 | Barney | 707/101 |
| 2007/0106659 A1 | 5/2007 | Lu et al. | 707/7 |
| 2007/0150473 A1 | 6/2007 | Li et al. | 707/7 |

FOREIGN PATENT DOCUMENTS

| | | |
|---|---|---|
| EP | 0950961 A2 | 10/1999 |
| EP | 0950961 A3 | 10/1999 |
| EP | 1050830 A2 | 11/2000 |
| EP | 1120717 A2 | 8/2001 |
| EP | 1282060 A2 | 2/2005 |
| EP | 1557770 A1 | 7/2005 |
| JP | 10091638 | 4/1998 |
| JP | 11328191 | 11/1999 |
| KR | 10-2002-0015838 A | 3/2002 |
| KR | 10-2003-0082109 A | 10/2003 |
| KR | 10-2006-0116042 A | 11/2006 |

OTHER PUBLICATIONS

Carmel, D. et al., "Searching XML Documents Via XML Fragments", SIGR Toronto, Canada, Jul.-Aug. 2003, pp. 151-158.
Craswell, N. et al., "TREC12 Web Track as CSIRO", TREC 12, Nov. 2003, 11 pp.
Cutler, M. et al., "A New Study on Using HTML Structures to Improve Retrieval", 11th IEEE International Conference on Chicago, IL, Nov. 9-11, 1999, pp. 406-409.
Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.
Fagin, R. et al., "Searching the Workplace Web", IBM Almaden Research Center, In Proceedings of the Twelfth International World Wide Web Conference, Budapest, 2003, 21 pgs.
Hawking, D. et al., "Overview of the TREC-8 Web Track", TREC, Feb. 2000, pp. 1-18.
Hawking, D., "Overview of the TREC-9 Track", TREC, 2000, pp. 1-16.
Hawking., D. et al., "Overview of TREC-7 Very Large Collection Track", TREC, Jan. 1999, pp. 1-13.
Heery, Rachel, "Review of Metadata Formats", Program, vol. 30, No. 4, Oct. 1996, 1996 IEEE, pp. 345-373.
Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.
Jones, K. et al., "A probabilistic model of information retrieval: development and status", Department of Information Science, City University, London, Aug. 1998, 74 pgs.
Kotsakis, E., "Structured Information Retrieval in XML Documents", Proceedings of the ACM Symposium on Applied Computing, Madrid, Spain, 2002, pp. 663-667.

Kucuk, Mehmet Emin, et al., "Application of Metadata Concepts to Discovery of Internet Resources", ADVIS 2000, INCS 1909, pp. 304-313, 2000.
Lalmas, M., "Uniform Representation of Content and Structure for Structured Document Retrieval", $20^{th}$ SGES International Conference on Knowledge Based Systems and Applied Artificial Intelligence, Cambridge, UK, Dec. 2000, pp. 1-12.
Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.
Losee, R. et al., "Research in Information Organization", Literature Review, School of Information and Library Science, Section 4, pp. 53-96, Jan. 2001.
Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.
Nelson, Chris, "Use of Metadata Registries for Searching for Statistical Data", IEEE 2002, Dimension EDI Ltd., pp. 232-235, 2002.
Numerico, T., "Search engines organization of information and Web Topology", http://www.cafm.1sbu.ac.uk/eminars/sse/numerico-6-dec-2004.pdf, Dec. 6, 2004, 32 pgs.
Ogilvie, P. et al., "Combining Document Representations for Known-Item Search", Proceedings of the $26^{th}$ Annual International ACM SIGIR Conference on Research and Development in Information Retrieval, Toronto, Canada, 2003, pp. 143-150.
Robertson, S. et al., "Okapi at TREC-4", 1996, 24 pp.
Robertson, S. et al., "Some Simple Effective Approximations to the 2-Poisson Model for Probabilistic Weighted Retrieval", Proceedings of the $17^{th}$ Annual International ACM SIGIR Conference on Research and Development in Information Retrieval, 1994, pp. 232-241.
Schulz, Stefan, et al., "Indexing Medical WWW Documents by Morphemes", MEDINFO 2001 Proceedings of the $10^{th}$ World Congress on Medical Informatics, Park I, IOS Press, Inc., pp. 266-270, 2001.
Singhal, A. et al., "AT&T at TREC-9", Proceedings of the Ninth Text Retrieval Conference, NIST Special Publication 500-249, 'Online! 2001, pp. 103-105.
Sturdy, Derek, "Squirrels and nuts: metadata and knowledge management", Business Information Review, 18(4), pp. 34-42, Dec. 2001.
Voorhees, E., "Overview of TREC 2002", Gaithersburg, Maryland, Nov. 19-22, 15 pp.
Westerveld, T. et al., "Retrieving Web pages using Content, Links, URLs and Anchors", Proceedings of the Tenth Text Retrieval Conference, NIST Special Publication, 'Online! Oct. 2001, pp. 1-10.
Wilkinson, R., "Effective Retrieval of Structured Documents", Annual ACM Conference on Research and Development, 1994, 7 pp.
Yi, Jeonghe,e et al., "Metadata Based Web Mining for Topic-Specific Information Gathering", IEEE, pp. 359-368, 2000.
Yi, Jeonghee, et al., "Using Metadata to Enhance Web Information Gathering", D.Suciu and G. Vossen (eds.): WebDB 2000, LNCS 1997, pp. 38-57, 2001.
Zamir, O. et al., "Grouper: A Dynamic Clustering Interface to Web Search Results", Computer Networks (Amsterdam, Netherlands: 1999), 31(11-16): 1361-1374, 1999.
"Microsoft SharePoint Portal Server 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pp.
"Microsoft Full-Text Search Technologies", http://www.microsoft.com/technet/prodtechnol/sppt/sharepoint/evaluate/featfunc/ms-searc..., published on Jun. 1, 2001, printed on May 22, 2006, 13 pp.
"Microsoft External Content in Microsoft Office SharePoint Portal Server 2003", http://www.microsoft.com/technet/prodtechnol/sppt/reskit/c2261881x.mspx, published on Jun. 9, 2004, printed on May 22, 2006, 20 pp.
"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pp.

Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.

"SharePoint Portal Server 2001 Planning and Installation Guide", http://www.microsoft.com/technet/prodtechnol/sppt/sharepoint/plan/planinst.mspx, printed on May 22, 2006, 86 pp.

U.S. 2006/0136411 A1 to Meyerzon et al., Jun. 2006; U.S. Appl. No. 11/019,091, filed Dec. 21, 2004 entitled "Ranking Search Results Using Feature Extraction".

U.S. 2006/0200460 A1 to Meyerzon et al., Sep. 2006; U.S. Appl. No. 11/073,381, filed Mar. 3, 2005 entitled "System and Method for Ranking Search Results Using File Types".

U.S. 2005/0210006 A1 to Robertson et a., Sep. 2005; U.S. Appl. No. 10/804,326, filed Mar. 18, 2004 entitled "Field Weighting in Text Document Searching".

U.S. 2006/0074871 A1 to Meyerzon et al., Apr. 2006; U.S. Appl. No. 10/955,462, filed Sep. 30, 2004 entitled "System and Method for Incorporating Anchor Text Into Ranking Search Results".

U.S. 2006/0074903 A1 to Meyerzon et al., Apr. 2006; U.S. Appl. No. 10/955,983, filed Sep. 30, 2004 entitled "System and Method for Ranking Search Results Using Click Distance".

U.S. Official Action in U.S. Appl. No. 11/238,906 mailed Sep. 26, 2008.

Smyth Barry, "Relevance at a Distance - An Investigation of Distance-Biased Personalization on the Mobile Internet", no date, pp. 1-6.

Senecal, Sylvain, "Consumers' Decision-Making Process and Their Online Shopping Behavior: A Clickstream Analysis", Jun. 1, 2004, pp. 1600-1607.

Fagin, Ronald, "Searching the Workplace Web", Mar. 3, 2005, pp. 1-10.

Wen, Jl-Rong, "Query Clustering Using User Logs", Jan. 2002, pp. 59-81.

Agichten et al., "Improving Web Search Ranking by Incorporating User Behavior Information"—http://www.mathcs.emory.edu/~eugene/papers/sigir2006ranking.pdf, 8 pp.

Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&dl=GUIDE&CFID=22810237&CFTOKEN=34449120, pp. 585-593.

Burges, Christopher J.C. et al. "Learning to Rank with Nonsmooth Cost Functions"—http://books.nips.cc/papers/txt/nips19/NIPS2006_0574.txt, 2 pp.

Filip Radlinski, et al.,, "Query Chains: Learning to Rank from Implicit Feedback," http://delivery.acm.org/10.1145/1090000/1081899/p239-radlinski.pdf?key1=1081899&key2=3628533811&coll=GUIDE& CFID=27212902&CFTOKEN=53118399, *KDD*'05, Chicago, IL, Aug. 21-24, 2005,10 pages.

Irina Matveeva, et al., "High Accuracy Retrieval with Multiple Nested Ranker," http://people.cs.uchicago.edu/~matveeva/RankerSIGIR06.pdf, *SIGIR*'06, Seattle, WA Aug. 6-11, 2006, 8 pages.

Gui-Rong Xue, et al., "Optimizing Web Search Using Web Click-Through Data," http://people.cs.vt.edu/~xwensi/Publication/p118-xue.pdf, *CIKM*'04, Nov. 8-13, 2004, 9 pages.

Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.

Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.

Shamsford, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.

MSDN, "Understanding Ranking," http://msdn.microsoft.com/en-us/library/ms142524.aspx, Sep. 2007, 4 pages.

Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.

U.S. Official Action in U.S. Appl. No. 11/073,381 mailed Sep. 18, 2007.

U.S. Official Action in U.S. Appl. No. 11/073,381 mailed Jul. 10, 2008.

U.S. Official Action in U.S. Appl. No. 11/206,286 mailed Jul. 14, 2008.

PCT Search Report in PCT/US2006/031965 mailed Jan. 11, 2007.

EP Exam Report in EP 05105048.2-2201 mailed Apr. 23, 2007.

Chinese First Official Action in 200510088527.5 mailed Apr. 18, 2008.

Chinese First Official Action in 200510088213.5 mailed May 9, 2008.

Chinese Second Official Action in 200510088213.5 mailed Oct. 10, 2008.

Chen, Michael et al., Cha Cha, "A System for Organizing Intranet Search Results", Computer Science Department, University of California, Berkeley, 1999, pp. 1-12.

U.S. Appl. No. 09/493,748, filed Jan. 28, 2000 entitled "Adaptive Web Crawling Using a Statistical Model".

U.S. Appl. No. 11/874,844, filed Oct. 18, 2007 entitled "Enterprise Relevancy Ranking Using a Neural Network".

U.S. Appl. No. 11/874,579, filed Oct. 18, 2007 entitled "Ranking and Providing Search Results Based in Part on a Number of Click-Through Features".

U.S. Appl. No. 12/207,910, filed Sep. 10, 2008 entitled "Document Length as a Static Relevance Feature for Ranking Search Results".

U.S. Official Action in U.S. Appl. No. 10/804,326 mailed Jun. 7, 2007.

U.S. Official Action in U.S. Appl. No. 10/955,983 mailed Jul. 21, 2008.

U.S. Official Action in U.S. Appl. No. 10/804,326 mailed Dec. 10, 2008.

U.S. Official Action in U.S. Appl. No. 11/019,091 mailed Dec. 11, 2008.

U.S. Official Action in U.S. Appl. No. 10/955,983 mailed Dec. 18, 2008.

U.S. Official Action in U.S. Appl. No. 11/206,286 mailed Dec. 24, 2008.

Chinese Second Official Action in 200510088527.5 mailed Dec. 26, 2008.

U.S. Official Action in U.S. Appl. No. 11/412,723 mailed Mar. 6, 2009.

U.S. Official Action in U.S. Appl. No. 11/073,381 mailed Apr. 15, 2009.

PCT Search Report in PCT/US2008/011894 mailed Feb. 27, 2009.

Chinese Final Rejection in 200510088213.5 mailed Mar. 6, 2009.

Chen, Hsinchun et al., "A Smart Itsy Bitsy Spider for the Web", Journal of the American Society for Information Science, 49(7), 1998, pp. 604-618.

Kleinberg, Jon M., "Authoritative Sources in a Hyperlinked Environment", Proceedings of the aCM-SIAM symposium on Discrete Algorithms, 1998, 34 pp.

U.S. Official Action in U.S. Appl. No. 11/238,906 mailed May 19, 2009.

U.S. Official Action in U.S. Appl. No. 10/955,983 mailed Jun. 10, 2009.

Chinese First Official Action mailed Jun. 19, 2009 in 200680029645.1.

* cited by examiner

| URL | HASH VALUE | FIRST ACCESS TIME | LAST ACCESS TIME | CHANGE COUNT | ACCESS COUNT |
|---|---|---|---|---|---|
| | | | | | |
| | | | | | |
| | | | | | |
| | | | | | |
| | | | | | |

FIGURE 4

Base Probability Distribution

| Base Probability of Document Change During Interval (N) | |
|---|---|
| P1 | .3/(n-1) |
| P2 | .3/(n-1) |
| P3 | .3/(n-1) |
| P4 | .3/(n-1) |
| P5 | .3/(n-1) |
| P6 | .3/(n-1) |
| P7 | .3/(n-1) |
| P8 | .3/(n-1) |
| P(n-1) | .3/(n-1) |
| Pn | .7 |

Sample Probabilities (N)

30% of documents are assumed to change and are uniformly distributed among the sample change rates. The number of documents with a given change rate is expressed as a percentage of all previously retrieved documents.

70% of documents assumed to never change

FIGURE 7B

PROXY SERVER USING A STATISTICAL MODEL

CROSS REFERENCE TO RELATED APPLICATIONS

This application is a continuation of U.S. patent application Ser. No. 09/603,695, now U.S. Pat. No. 6,883,135, filed Jun. 26, 2000 and entitled "Proxy Server Using a Statistical Model", the entire contents of which are hereby incorporated by reference in its entirety.

This application is a related by subject matter to inventions disclosed in commonly assigned U.S. patent application Ser. No. 09/493,748, now abandoned, filed Jan. 28, 2000, and entitled "ADAPTIVE WEB CRAWLING USING A STATISTICAL MODEL," the contents of which are hereby incorporated by reference in their entirety.

TECHNICAL FIELD

The present invention relates generally to the field of network information software and, and more particularly to methods and systems for retrieving data from network sites.

BACKGROUND OF THE INVENTION

In recent years, there has been a tremendous proliferation of computers connected to a global network known as the Internet. A "client" computer connected to the Internet can download digital information from "server" computers connected to the Internet. Client application software executing on client computers typically accept commands from a user and obtain data and services by sending requests to server applications running on server computers connected to the Internet. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the "Gopher" document protocol.

The HTTP protocol is used to access data on the World Wide Web, often referred to as "the Web." The World Wide Web is an information service on the Internet providing documents and links between documents. The World Wide Web is made up of numerous Web sites located around the world that maintain and distribute documents. The location of a document on the Web is typically identified by a document address specification commonly referred to as a Universal Resource Locator (URL). A Web site may use one or more Web server computers that store and distribute documents in one of a number of formats including the Hyper Text Markup Language (HTML). An HTML document contains text and metadata or commands providing formatting information. HTML documents also include embedded "links" that reference other data or documents located on any Web server computers. The referenced documents may represent text, graphics, or video in respective formats.

A Web browser is a client application or operating system utility that communicates with server computers via FTP, HTTP, and Gopher protocols. Web browsers receive documents from the network and present them to a user. Internet Explorer, available from Microsoft Corporation, of Redmond, Wash., is an example of a popular Web browser application.

An intranet is a local area network containing Web servers and client computers operating in a manner similar to the World Wide Web described above. Typically, all of the computers on an intranet are contained within a company or organization.

Generally, a proxy server is a server that sits between a secure network, such as a corporate intranet, and a non-secure network, such as the Internet. It processes requests from computers on the intranet for access to resources on the Internet, while limiting or blocking access to the intranet from external computer systems. For efficiency purposes, it may in some cases attempt to fulfill these requests itself.

In a typical proxy server implementation, the proxy server operates to filter requests for Web pages from the corporate intranet to the Internet. Web page requests are routed by the proxy server to the non-secure network and upon receipt of a requested Web page from the non-secure network, the proxy server forwards the Web page to the end user.

Proxy servers are often configured with a local cache area which might be located on a disc drive and in which are stored Web pages that have previously been accessed. Upon receipt of a request for a previously accessed Web page, the proxy server can access the copy of the Web page stored on local disc rather than request the page from the non-secure network.

Thus, the cache contains copies of Web pages, wherein the actual Web pages exist on the non-secure network. Of course, the actual Web pages may, and often do change. When a Web page on the non-secure network changes, the copy of the Web page stored in cache becomes out-of-date. In order to minimize the probability that an out-of-date Web page will be routed to a user, it is necessary to periodically refresh the cache, i.e. re-fetch the Web page from the non-secure network.

In existing proxy servers, the decision of whether to re-fetch a Web page is made by referencing information stored in the Web page header. Generally, Web page headers may have stored therein an expiration date and a modification time. The expiration date identifies an estimated date after which the Web page can no longer be considered to be current and the modification time identifies the time the Web page was last modified. In existing proxy servers, if a Web page's expiration date has expired, the proxy server issues a request across the non-secure network to forward a new copy of the Web Page if the modification time for the Web page stored on the non-secure network is different than that stored on the proxy server. Thus, if the modification time indicates that the Web page has changed, the Web page on the proxy server is updated.

There are, however, problems presented in relying on header information for making re-fetch decisions. For example, the header information for many Web pages does not include expiration dates and modification times, thereby making it impossible to rely on this information for re-fetch decisions. Additionally, the expiration date, even when present, is not necessarily reliable as it represents only an estimate of when a Web page may be changed. Furthermore, Web page header information is stored with the actual Web pages on the non-secure network. In order to check the modification time for a Web page and make a re-fetch decision, it is necessary to access the modification time across the non-secure network. Making connections over the non-secure network slows the decision process and adds to system overhead.

Therefore, it is desirable to have an improved proxy server. More specifically, it would be a significant improvement in the art to have a mechanism by which a proxy server can selectively access either an original document located across a network or a previously retrieved copy of the document stored locally in cache based in part on the probability that the document has actually changed in some substantive way since it was last accessed. Preferably, such a mechanism will make the decision to access or not to access the original Web document without having to establish a connection with a host server that stores the original of the document. The mechanism would also preferably provide a way to continually improve the accuracy of its decisions to retrieve a document either from cache or across a network based on the actual experience of the proxy server as it tracks changed documents encountered during Web accesses. If a decision is made by the proxy server to access a document across the web as opposed to the copy in cache, the mechanism should provide a way to quickly and accurately determine if the original document has indeed changed. The present invention is directed to providing such a mechanism.

SUMMARY OF THE INVENTION

Briefly, the present invention is directed toward remedying these shortcomings by providing an improved proxy server for retrieving data from a computer network. The proxy server employs novel systems and methods to intelligently determine, based in part on a statistical model and prior document retrievals, which documents are most likely to have changed since a previous retrieval and adaptively decide on whether to access a copy of a document stored in cache or to access the original document across a network.

In accordance with an aspect of the invention, each document retrieval request begins with an active probability distribution containing a plurality of probabilities indicative that a document has changed at a given change rate. A history map is maintained by the proxy server that references a number of documents that have previously been accessed. For each referenced document in the history map, a document probability distribution is initialized as a copy of the active probability distribution. The document probability distribution is trained under a statistical model. The training is based on changes to the document experienced by the proxy server during the previous document retrievals. A probability that the document has changed is during an interval of interest is then computed based on the document probability distribution and the statistical model. A decision to access or not to access the document is made with the aid of this computed probability.

In accordance with additional aspects of the invention, the document probability distribution is trained for events as experienced with the document upon previous accesses. These events may include "change events" or "no change events." A change event may be where the document was found to have changed in some substantive manner since the last access of the document. A no change event may be where an access to the document determines that the document has not changed. A no change event determination may be made in many ways, such as by evaluating a time stamp associated with the document, or if no substantive change is found when a hash value of the currently retrieved document matches a hash value of the previously retrieved document. Events such as "no change chunk events" may also be interpolated from experienced events, as is described in detail below.

The probability that the document has changed (the "document change probability") is computed based on is the document probability distribution. A bias is then computed based on the document change probability in conjunction with a synchronization level. The synchronization level may be a predefined value that specifies the percentage of documents that are expected to be synchronized at any given time. A decision whether to access the document is made based on a "coin-flip" using the computed bias.

In accordance with further aspects of the invention, the methods and systems of the present invention conserve computer resources by balancing the need for accuracy in the statistical model against the computer storage and computing resources available. In an actual embodiment of the invention, a minimal amount of historical information is maintained for each document in a history map. This historical information is converted by the method and systems of the present invention to interpolate change events, no change events, and no change chunk events by mapping data recorded in the history map to a timeline. From the interpolation, the variables required by the statistical model can be determined with reasonable accuracy, given the limited resources available to the proxy server and the need for speedy processing when conducting a document retrieval.

In accordance with still further aspects of the invention, when a proxy server in accordance with the invention first begins operating, a training probability distribution is initialized to essentially zero by multiplying a copy of a base probability distribution (containing a starting point estimate of probabilities that a document will change at a given change rate) by a small diversity factor. The training probability distribution recursively accumulates the document probability distribution for each document that is retrieved across the network. By summing each probability in the training probability distribution with a corresponding probability from each document probability distribution, the training probability distribution represents the accumulated experience associated with the document probability distributions for all documents processed. Periodically, the training probability distribution is stored and used as the active probability distribution for future document retrievals. This feed-back of the training probability distribution into the active probability distribution provides for a constantly-improving statistical model for determining whether to retrieve a document from cache or across the Internet.

In accordance with other aspects of this invention, a secure hash function is used to determine a hash value corresponding to each previously retrieved document. The hash value is stored in a history map and is used in subsequent document retrievals to determine whether the corresponding current document is modified. A secure hash function may be used to obtain a new hash value, which is compared with the hash value for the previously retrieved document data. If the hash values are equal, the current document is considered to be substantively equivalent to the previously retrieved document data. If the hash values differ, the current document is considered to be modified and a change counter is incremented for the document. An access counter may also be incremented each time a network access is attempted for the current document.

As will be readily appreciated from the foregoing description, a system and method formed in accordance with the invention minimizes the re-fetching of documents across a network. Thus, the invention provides a proxy server that responds to document requests in less time and with greater efficiency.

BRIEF DESCRIPTION OF THE DRAWINGS

Other features of the invention are further apparent from the following detailed description of presently preferred exemplary embodiments of the invention taken in conjunction with the accompanying drawings, of which:

FIG. 4 illustrates an exemplary history map in accordance with the present invention;

FIGS. 7A-C illustrate the initialization of base distributions, in accordance with the invention;

FIGS. 10A-1 to A-2 are functional flow diagrams illustrating a process of training the document probability distribution, in accordance with an actual embodiment of the present invention;

FIGS. 10C-1 to C-2 are functional flow diagrams illustrating a process of training the document probability distribution for each experienced or interpolated event, in accordance with an actual embodiment of the present invention.

DETAILED DESCRIPTION OF THE INVENTION

Overview

The present invention is directed to improved computer-based systems and methods for determining whether to retrieve a copy of a document from cache or to re-fetch the original document across a network. The systems and methods employ a statistical model and data collected from past retrievals to adaptively decide whether or not to re-fetch a document. Specifically, the system maintains an active probability distribution that contains a plurality of probabilities indicative that a document has changed at a given change rate. The system further maintains a history map having data stored therein for the documents that have previously been fetched and now residing in cache. For each document having an entry in the history map, a document probability distribution is initialized as a copy of the active probability distribution. The document probability distribution is revised or "trained" using the data in the history map that specifies changes to the document experienced during previous retrievals. A probability that the document may have changed is calculated based upon this "trained" document probability distribution and a statistical model, which in one embodiment is based upon a Poisson distribution. A decision to access or not to access the document is made with the aid of this computed probability that the document may have changed.

Prior to explaining the details of the invention, it is useful to provide a description of a suitable exemplary environment in which the invention may be implemented.

Exemplary Operating Environment

1. A Computer Environment

Figure 1:
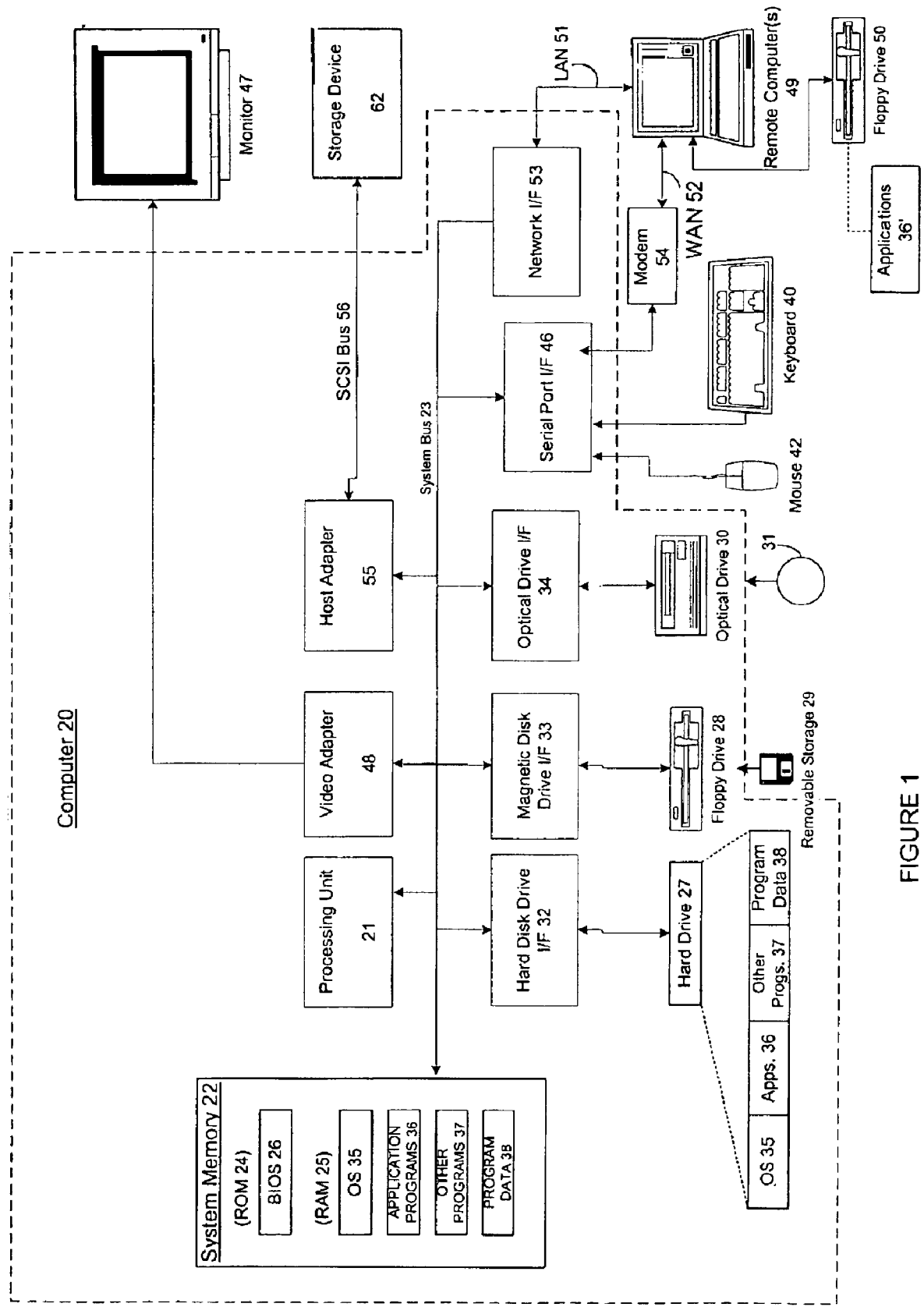
FIG. 1 is a block diagram of a general purpose computer system for implementing the present invention.

FIG. 1 and the following discussion are intended to provide a brief general description of a suitable computing environment in which the invention may be implemented. Although not required, the invention will be described in the general context of computer-executable instructions, such as program modules, being executed by a computer, such as a workstation or server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCS, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Further, as used herein, the term "computer readable medium" includes one or more instances of a media type (e.g., one or more floppy disks, one or more CD-ROMs, etc.).

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the-system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
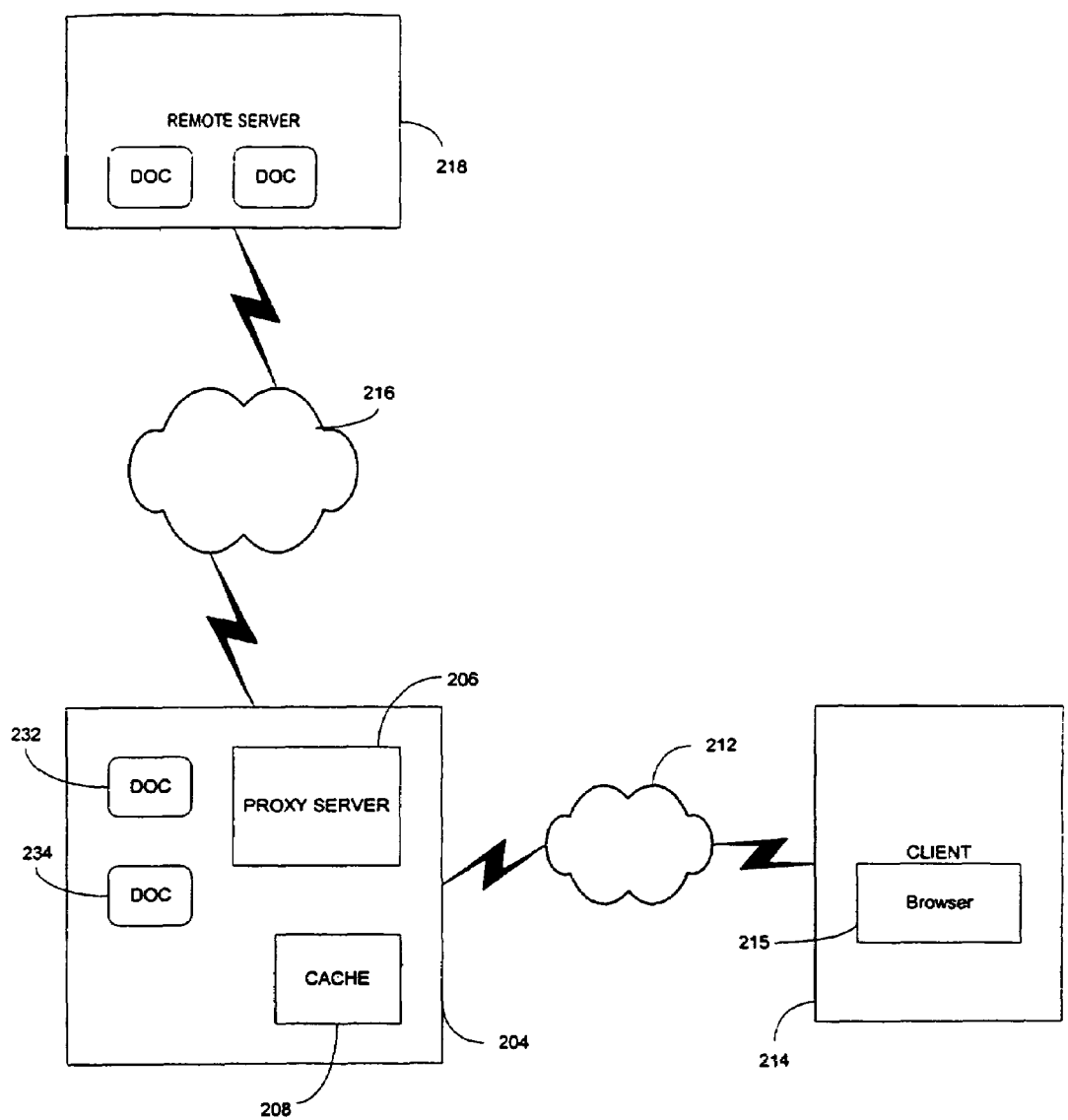
FIG. 2 is a block diagram illustrating a network architecture, in accordance with the present invention.

FIG. 2 illustrates an exemplary architecture of a networked system in which the present invention operates. A server computer 204 includes a proxy server 206 executing thereon. The proxy server program 206 operates to filter requests for documents distributed on one or more computers connected to a computer network 216, such as the remote server computer 218 depicted in FIG. 2. Documents that are retrieved by proxy server 206 over network 216 may be stored in cache 208 for access at a later time.

The computer network 216 may be a local area network 51 (FIG. 1), a wide area network 52, or a combination of networks that allow the server computer 204 to communicate with remote computers, such as the remote server computer 218, either directly or indirectly. The server computer 204 and the remote server computer 218 are preferably similar to the personal computer 20 depicted in FIG. 1 and discussed above.

A client computer 214, such as the personal computer 20 (FIG. 1), is connected to the server computer 204 by a computer network 212. The computer network 212 may be a local area network, a wide area network, or a combination of networks. The computer network 212 may be the same network as the computer network 216 or a different network. The client computer 214 includes a computer program, such as a "browser" 215 that locates and displays documents to a user.

When a user at the client computer 214 desires to retrieve one or more documents that may be located, for example, on server 218, the client computer transmits a request to a server computer 204. Proxy server 206 handles the request. If the document has previously been retrieved and stored in cache 208, proxy server 206 determines, as described in detail below, whether to retrieve the document from cache 208 or to re-fetch the document across network 216 from remote server 218.

As will be readily understood by those skilled in the art of computer network systems, and others, the system illustrated in FIG. 2 is exemplary, and alternative configurations may also be used in accordance with the invention. For example, the server computer 204 itself may include documents 232 and 234 that are accessed by proxy server program 206. Additionally, the Web browser program 215 and the proxy server program 206 may reside on a single computer. As discussed above, the client computer 214, the server computer 204, and the remote server computer 218 may communicate through any type of communication network or communications medium.

Detailed Description of Proxy Server Cache Using a Statistical Model

Figure 3:
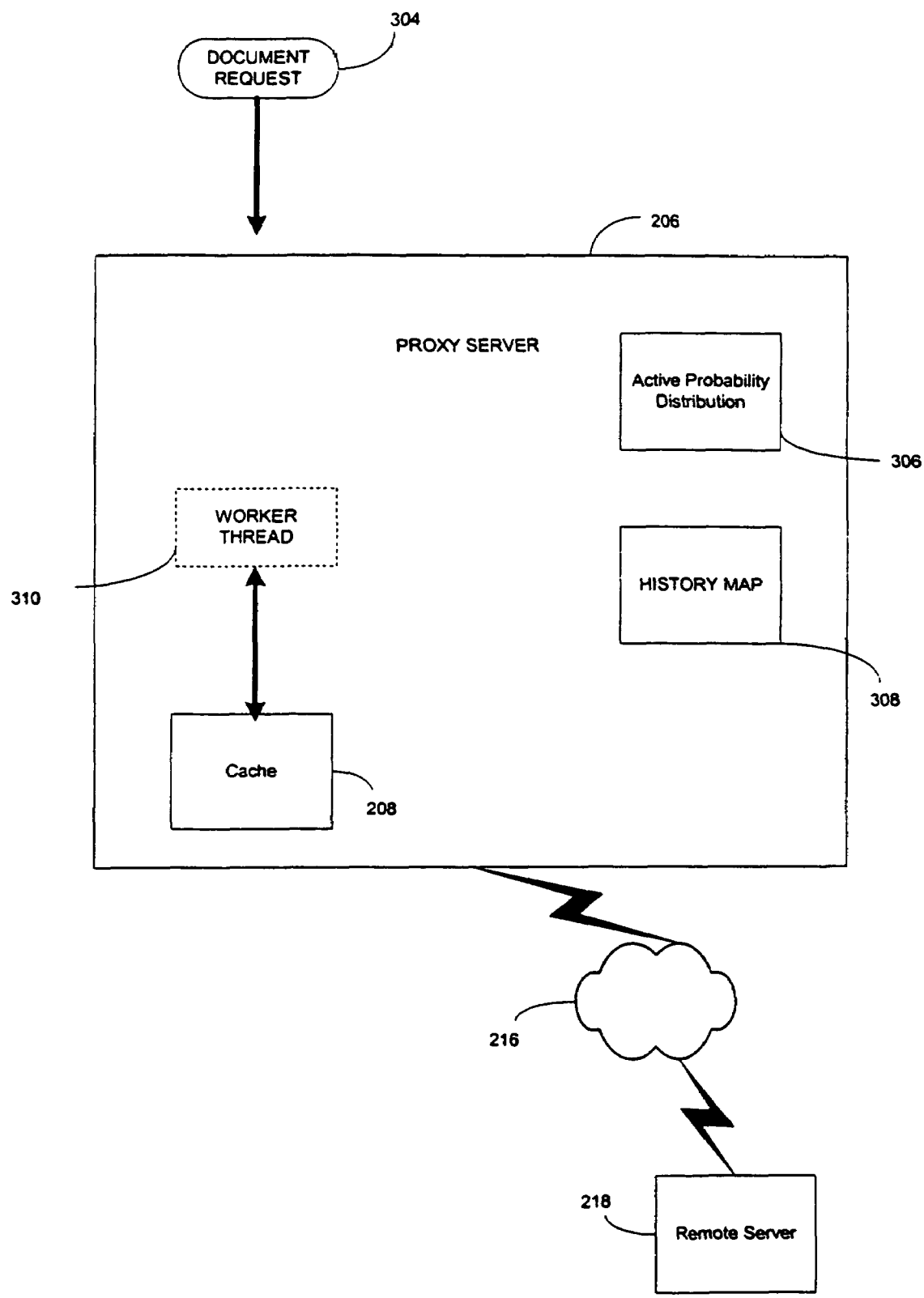
FIG. 3 is a block diagram illustrating some of the components used in the invention.

FIG. 3 is a diagram of the functional components of proxy server 206 in accordance with the invention. As shown, proxy server 206 comprises an active probability distribution 306 containing a plurality of probabilities indicative that a document has changed at a given change rate. Proxy server 206 further comprises history map 308, which contains a ongoing list of URLs and other historical information about documents that have previously been retrieved across network 216 and which are stored in cache 208. Upon receipt of a document request 304, worker thread 310 employs active probability distribution 306 and the data stored in history map 308 in the algorithms shown in FIGS. 5 through 11 and described below to determine whether the document should be retrieved from cache 208 or re-fetched across network 216. When a document is re-fetched across network 216, the data related to the particular document in history map 308 is updated as described in detail with reference to FIG. 6. Active probability distribution 306 is periodically updated as described in relation with FIG. 11 to reflect information learned through prior retrievals.

FIG. 4 illustrates an exemplary history map 308 in accordance with the present invention. History map 308 comprises historical data regarding previous network accesses of documents that are now stored in cache 206. Preferably, the history map 308 is stored in a nonvolatile memory so that it is persistent across multiple document retrievals and system shutdowns. As depicted, the history map 308 includes multiple entries 410, one entry corresponding to each URL 412. Each URL 412 specifies a document address specification associated with the corresponding document.

The history map further includes a hash value 416 corresponding to each document identified in the history map. A hash value results from applying a "hash function" to the document. A hash function is a mathematical algorithm that transforms a digital document into a smaller representation of the document (called a "hash value"). A "secure hash function" is a hash function that is designed so that it is computationally unfeasible to find two different documents that "hash" to produce identical hash values. A hash value produced by a secure hash function serves as a "digital fingerprint" of the document. The "MD5" is one such secure hash function, published by RSA Laboratories of Redwood City, Calif. in a document entitled RFC 1321, suitable for use in conjunction with the present invention.

Historical information such as the first access time 422, the last access time 424, the change count 426, and the access count 428 are used in a statistical model for deciding if a document should be re-fetched across the network 216 or retrieved from cache 208, as is discussed below with reference to FIG. 8A-B. The first access time 422 is set when the document is first accessed across the network; the last access time 424 is set to the most recent time that the document was accessed across the network; the change count 426 is a counter that is incremented each time the document is discovered to have changed in a substantive way, and the access count 428 is a counter that is incremented each time the document is accessed across the network.

Figure 5:
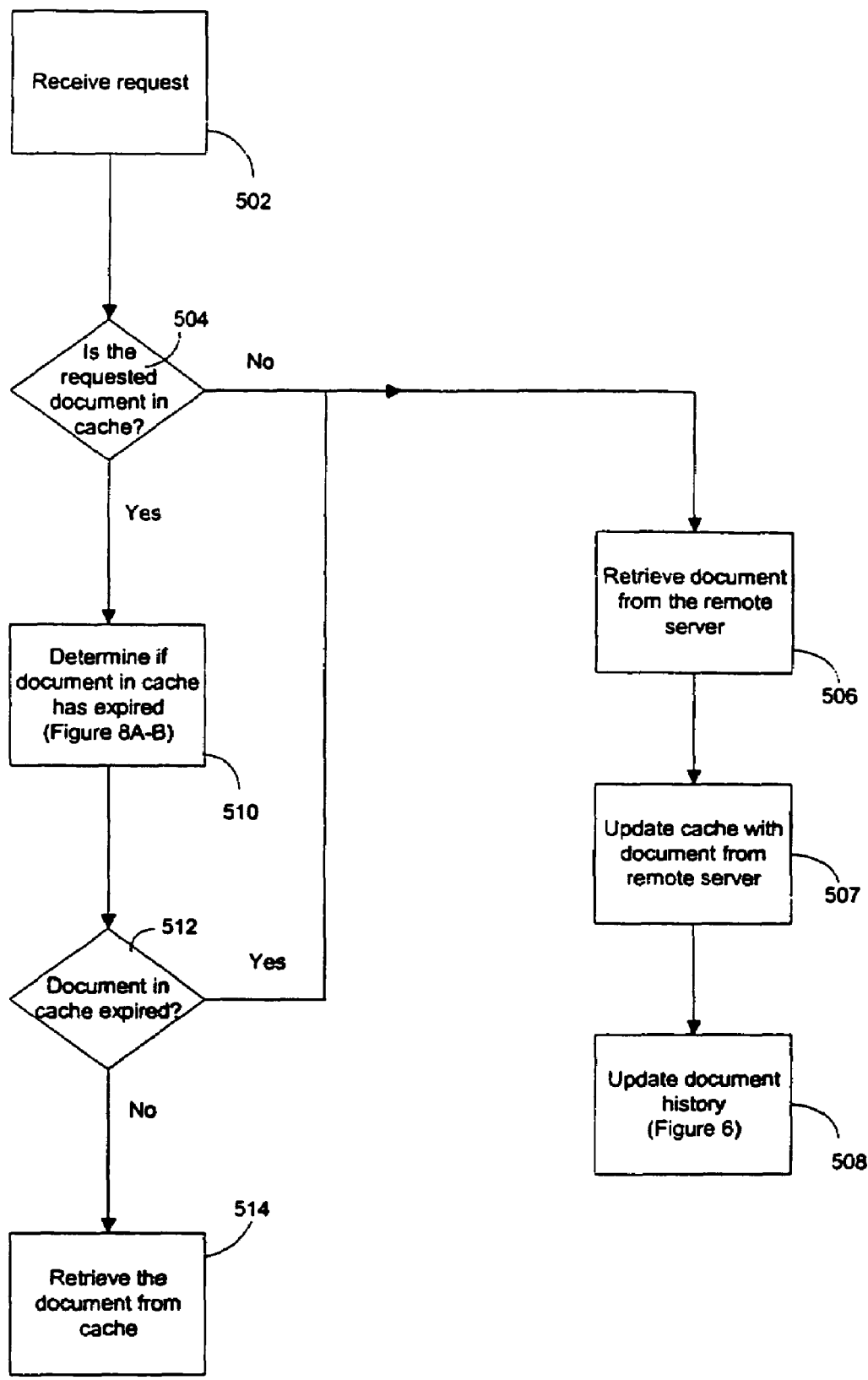
FIG. 5 is a flow diagram illustrating a high level process for deciding whether to retrieve a document from cache or re-fetch the document across a network in accordance with the present invention.

FIG. 5 is a flow diagram illustrating the high level process employed by proxy server 206 for servicing document requests from a client computer 214. As shown, at step 502 a document request is received. Proxy server 206 determines at step 504 whether the document is stored in cache 208. If not, at step 506 proxy server 206 retrieves the document across network 216. Thereafter, at step 507 the cache is updated with the new document and at step 508 history map 308 is updated as described in detail with relation to FIG. 6 to reflect the retrieval from the network.

If at step 504, it is determined that the requested document is stored in cache, at step 510 it is determined whether the document in cache 208 has "expired," indicating that the document needs to be re-fetched across the network. The process for making this decision is described in detail below with reference to FIGS. 8A-B. If at step 512, the document in cache 208 is determined to have expired, program flow continues at step 506 wherein the document is retrieved across network 216. However, if the document in cache 208 has not expired, at step 514 the document is retrieved from cache 208. Thus, the document request is serviced by proxy server 206 either by retrieving a copy of the document from cache 206 or by re-fetching the document across network 216. The algorithm for deciding which of these two alternatives is selected is described in detail below.

Figure 6:
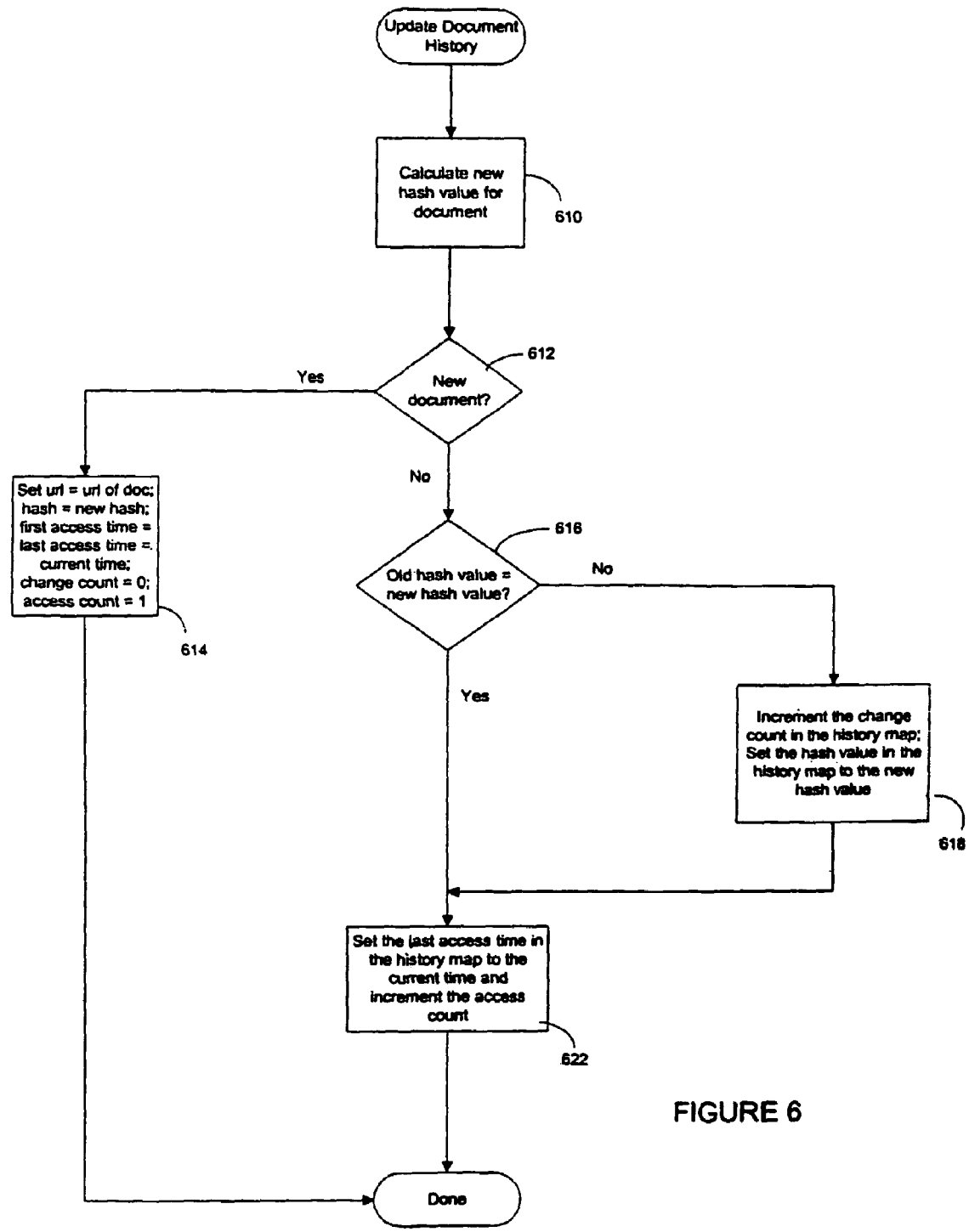
FIG. 6 is a flow diagram illustrating the process of updating a history map in accordance with the invention.

FIG. 6 is a flow chart illustrating the process employed by proxy server 206 to update history map 308 after retrieving a document across network 216. As shown, at step 610, a new hash value is calculated for the recently retrieved document. At step 612, it is determined whether the re-fetched document has an entry in history map 308. A document might not have an entry in history map 308 if, for example, it had not previously been retrieved by proxy server 206. If at step 612, no entry is found in history map 308 for the requested document, at step 614 a new entry is made corresponding to the newly retrieved document. The new history map entry comprises the following values: URL 412 is set equal to the resource locator for the retrieved document; hash value 416 is set equal to the hash value computed at step 610; first access time 422 and last access time 424 are set equal to the current time; access count 426 is set equal to 1; and change count 428 is set equal to zero.

If, at step 612, it is determined that an entry exists in history map 308 for the re-fetched document, at step 616, hash value 416 of the corresponding document is located in history map 308 and compared with the new hash value calculated at step 610. If the two values are equal, indicating that the filtered data corresponding to the newly retrieved document is the same as the filtered data corresponding to the previously retrieved version of the document, processing continues to step 622. If, at step 616, the hash values are not equal, indicating that the document has changed, at step 618, the change count 426 is incremented and hash value 416 is set equal to the new value calculated at step 610. The change made to the change count 426 indicates that the document was found to have changed in a substantive way. At step 622, the last access time 424 is set to the current time and the access count 428 is incremented.

Figure 7A:
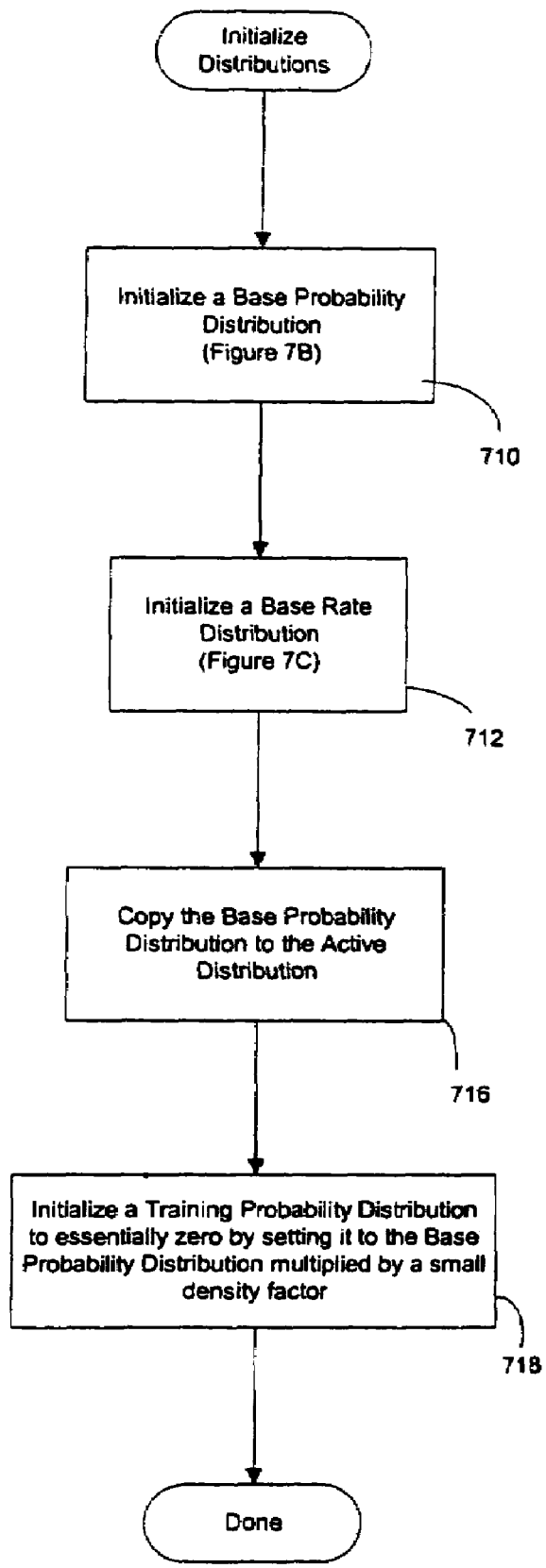
Figure 7C:
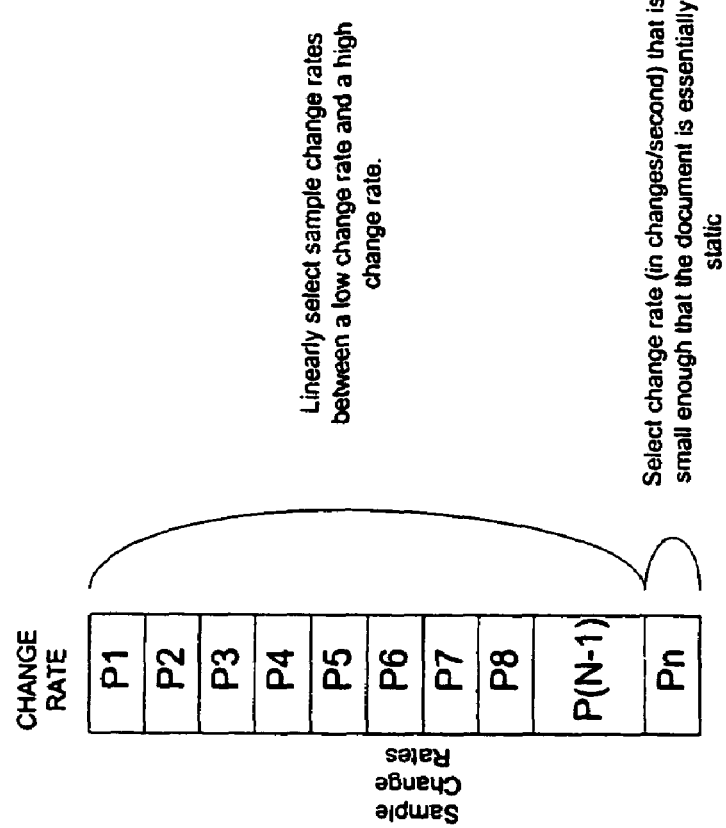

FIGS. 7A-C illustrate a process performed when the proxy server 206 first begins operating for initializing base probability and rate distributions that are employed in the below described algorithms to decide whether or not to re-fetch a previously retrieved document. Those statistical distributions may be used as a starting point by the statistical model to determine if a document should be accessed across the network or retrieved from cache 208. A probability distribution (base, document, training, or active) estimates a continuous probability function that a document has changed at a given change rate. Because of the constraints of current computer processing capabilities, the statistical model estimates the continuous probability function by tracking a plurality of probabilities at sample rates. The greater the "resolution", or number of probabilities at sample rates tracked, the better the estimate of the actual function. In an actual embodiment of the invention, the resolution is twenty sample points, or probabilities. This resolution is believed to provide a reasonable balance between accuracy and speed of computation. Of course, as the speed of computers increases, the resolution may be advantageously increased.

Turning to FIG. 7A, at step 710, a base probability distribution is initialized so that each probability in the distribution contains an estimated initial probability that one document will change with a certain change rate. These estimated initial probabilities need not be very accurate initially, since the method described below will improve the accuracy through training. However, more accurate initial probabilities may be preferable.

A method of an actual embodiment of the invention for estimating a set of starting values for the base probability distribution is illustrated in FIG. 7B. It has been estimated that approximately 30% of the documents on the Web will change at varying rates, while the remaining approximately 70% of the documents will remain relatively static during a defined interval. Since the probability distribution will contain a set of probabilities P1 to Pn that sum to 1 (or in percentages: 100%) regardless of the resolution, 30% of the 100% is distributed evenly over P1 to P(n−1) such that P(n)=0.3/(n−1). The remaining 70% of the 100% of probabilities is assigned to the last probability (Pn=0.7) in the distribution.

Expressed in this way, the base probability distribution, and all probability distributions that descend from it, represent the probability that the document will change at a given rate, over a plurality of sample rates. It will be apparent to one skilled in the art that there are many ways to estimate and express initial base probability distributions while remaining within the spirit and scope of the present invention. For instance, the initial probability rates may be set to anything from normalized random numbers to actual probability rates determined experimentally over time.

Returning to FIG. 7A, a base rate distribution is provided for the statistical computations regarding the document. The base rate distribution reflects the selection of the sample points at which the continuous probability function will be estimated. At step 712, the base rate distribution is initialized. One computation for initializing the base rate distribution is illustrated in FIG. 7C. In the base rate distribution, a plurality of change rates are chosen and expressed in an actual embodiment of the invention as number of changes per second. Each change rate has a corresponding probability in the base probability distribution. In an actual embodiment of the invention, the first rate R1 to rate R(N−1) are chosen at evenly spaced change rates between a Low change rate and a High change rate using the formula:

Formula 1:
$$Rn = \frac{1}{3600 * \left[\text{High} + \left((n-1) * \left(\frac{\text{Low} - \text{High}}{N-2}\right)\right)\right]}$$

Where High is the highest expected change rate, Low is the lowest expected change rate, and N is the number of samples, or resolution. The final change rate (RN) in the change rate distribution is assigned a change rate that is low enough that the document is essentially considered static. Although one actual method for selecting sample rates has been described here, those skilled in the art will appreciate that any number of ways are available for selecting a sample rate and each may be employed by the mechanism of the invention without deviating from the spirit or scope of the invention.

As will be explained below, the active probability distribution serves as the starting point for evaluating a request for a document by providing a starting value for document probability distributions. The active probability distribution is initialized to the value of the base probability distribution. Thus, returning to FIG. 7A, at step 716, the base probability distribution is copied to an active probability distribution. At step 718, the base probability distribution is copied to a training probability distribution and set to essentially zero by multiplying each probability in the base probability distribution by a very small diversity constant. Once the starting point for each of the distributions is initialized, the process of FIG. 7A is complete and terminates at ending step 722.

It should be noted, however, that the above values are initial values that are set when proxy server 206 first begins operation. During the operation of proxy server 206, the training probability distribution changes as described below with reference to FIG. 11 and likewise, periodically, the active probability distribution will be updated to correspond to the training probability distribution.

Figure 8A:
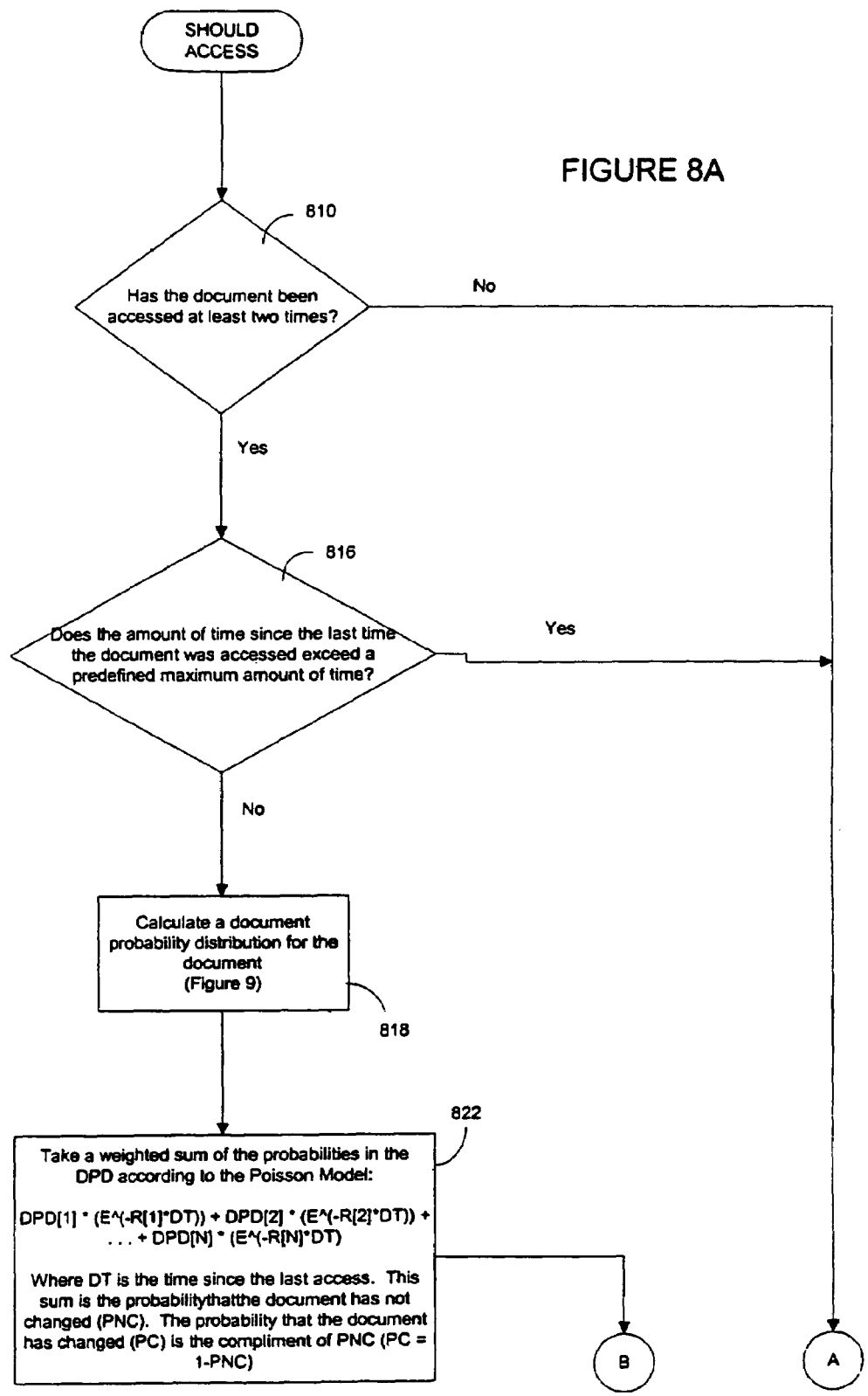
FIGS. 8A-B are a functional flow diagram illustrating a process of the present invention for determining if a document should be accessed from cache or re-fetched.
Figure 8B:
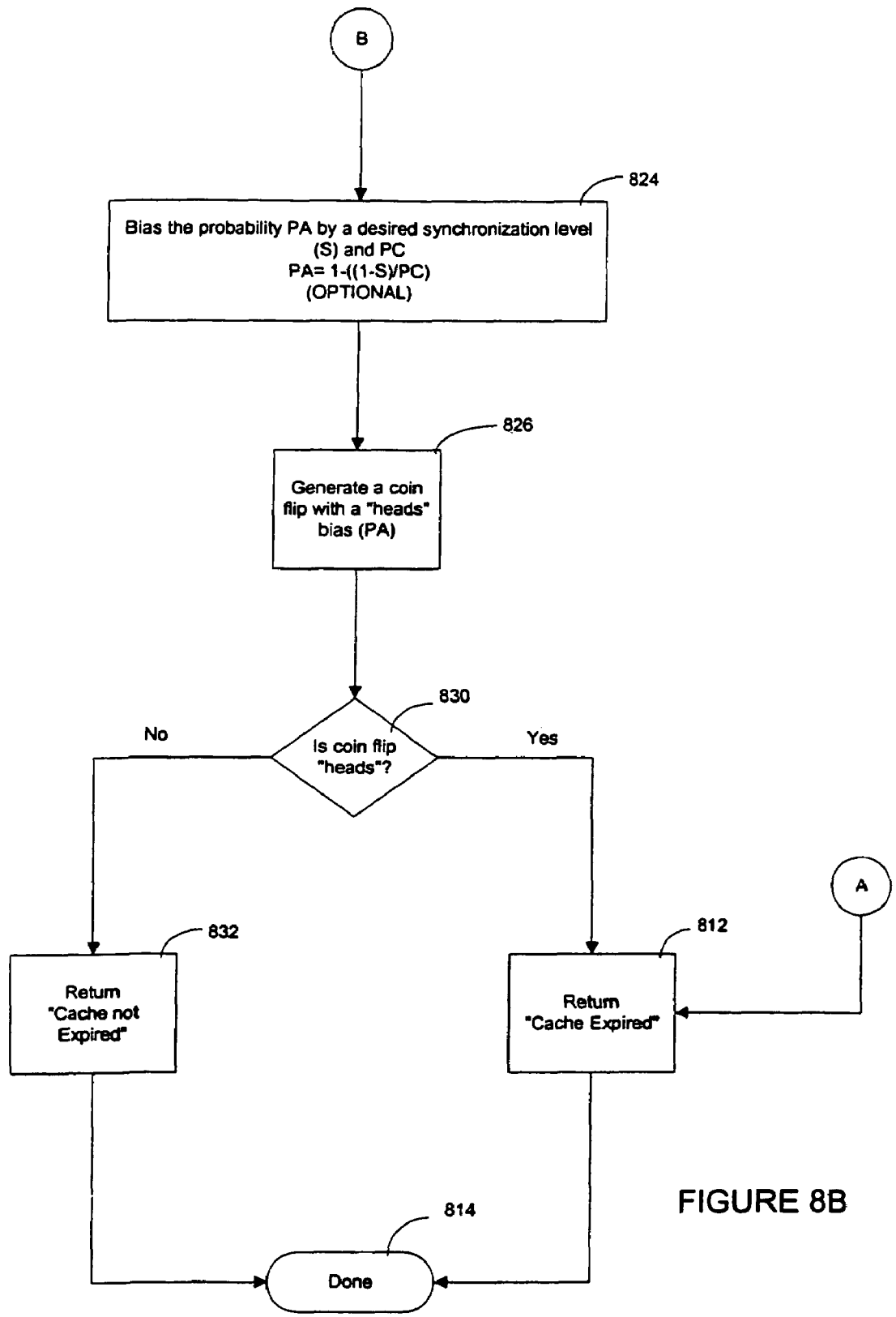

FIGS. 8A and 8B illustrate a process corresponding to step 510 of FIG. 5 that employs a statistical model to determine whether the document should be retrieved from cache 208 or re-fetched across network 216. In one embodiment, at least two accesses of the document across network 216 are completed before a document probability distribution is considered to be trained for experience with the document. If the document has not been accessed across the network 216 at least two times, decision step 810 passes the process to step 812, where an "cache expired" response is returned indicating that the document should be fetched over network 216. If the document has been accessed at least two times, the process continues from decision step 810 to decision step 816.

At decision step 816, a determination is made whether a predefined maximum amount of time has expired since the last time the document was accessed. In other words, the present invention optionally provides a mechanism to ensure that a document is retrieved across network 216 after a certain amount of time regardless of whether the document may have changed. If the time has expired, the process continues to step 812 where a "cache expired" response is returned. If not, the process continues to step 818.

Figure 9:
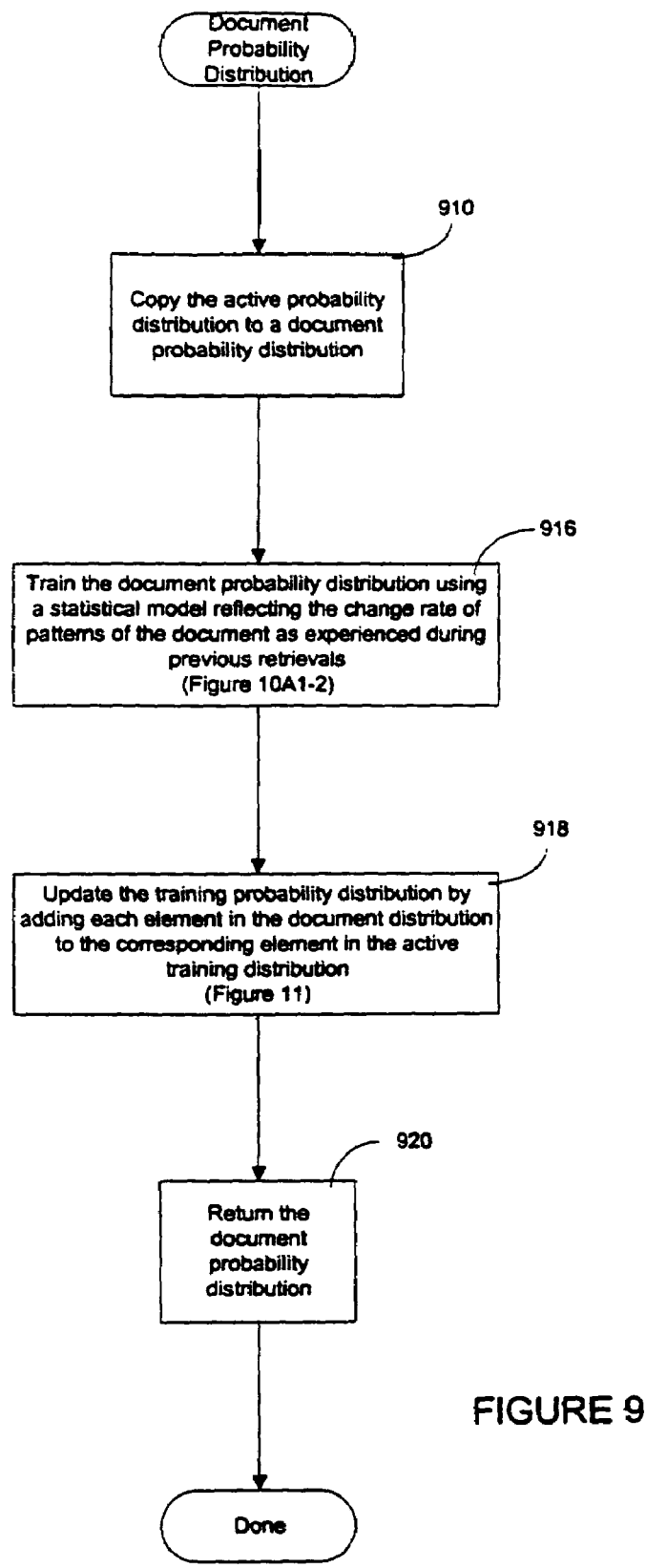
FIG. 9 illustrates the process of creating and training a document probability distribution, in accordance with the present invention.

At step 818, a document probability distribution is calculated for the document being processed. The calculation of the document probability distribution is illustrated in FIG. 9 and described below. Briefly described, the document probability distribution includes a number of probabilities indicative that a document has changed at a given change rate. After the document probability distribution for the document is calculated, the process continues to step 822.

At step 822, a weighted sum of the probabilities in the document probability distribution is taken according to the Poisson model, with DT equal to the time since the last access of the document (i.e., DPD[1]*(E^(−R[1]*DT))+DPD[2]* (E^(−R[2]*DT))+ . . . + DPD[n]*(E^(−R[n]*DT)). The weighted sum thus computed is the probability that the document has not changed (PNC). The probability that the document has changed (PC) is the complement of PNC (PC=1− PNC).

At step 824, a probability that the document will be accessed (PA) may be optionally computed and biased by both a specified synchronization level (S) and the probability that the document has changed (PC). In other words, this embodiment of the invention optionally allows the ultimate decision whether to retrieve a document to be biased by a synchronization level, specified by a system administrator. By adjusting the synchronization level, a system administrator may bias the likelihood of retrieving documents in accordance with the administrator's tolerance for having unsynchronized documents. Thus, using the formula PA=1−((1−S)/ PC), where S is the desired synchronization level and PC is the probability that the document has changed as calculated in step 822, a probability (PA) that the document should be accessed is calculated.

At step 826, a coin flip is generated with a "heads" bias equal to the probability of access (PA) computed in step 824. A decision is made to either "access" or "not access" the document across the network based on the result of this coin flip. The coin flip is provided because it may be desirable to add a random component to the retrieval of documents in order to strike a balance between the conservation of resources and ensuring document synchronization. The bias PA calculated at step 824 is applied to the coin flip to influence the outcome in favor of the likelihood that the document has changed, modified by the desired synchronization level. The outcome of the coin flip is passed to decision step 830.

At decision step 830 if the outcome of the coin flip is "heads", the instruction "cache expired" is returned at step 812. Otherwise, the instruction "cache not expired" indicating the document should be retrieved from cache is returned at step 832. Following steps 812 or 832, the process of FIGS. 8A and 8B is done.

FIG. 9 illustrates a process performed to calculate a document probability distribution as required at step 818 of FIG. 8A. The process begins at step 910 by making a copy of active probability distribution 306 as a new instance of a document probability distribution. The active probability-distribution 306 contains a plurality of probabilities indicative that a document has changed at a given change rate. When the system first begins operating, active probability distribution 306 is initialized to the default value as defined above with reference to FIG. 7A and thereafter is periodically updated by the training probability distribution. At step 916, the document probability distribution is trained using a statistical model that reflects the change rate patterns of the document as experienced during previous document retrievals. The training of the document probability distribution is illustrated in detail in FIG. 10A1-2 and described below. Briefly described, the document probability distribution is trained for "change," "no change," and "no change chunk" event intervals using a discrete random-variable distribution. Once the document probability distribution has been trained, the process continues to step 918, where the document probability distribution is added to the training probability distribution as illustrated in more detail in FIG. 11. The document probability distribution is returned to step 818 of FIG. 8A in step 920, and the process illustrated in FIG. 9 is finished.

Figures 1, 10A:
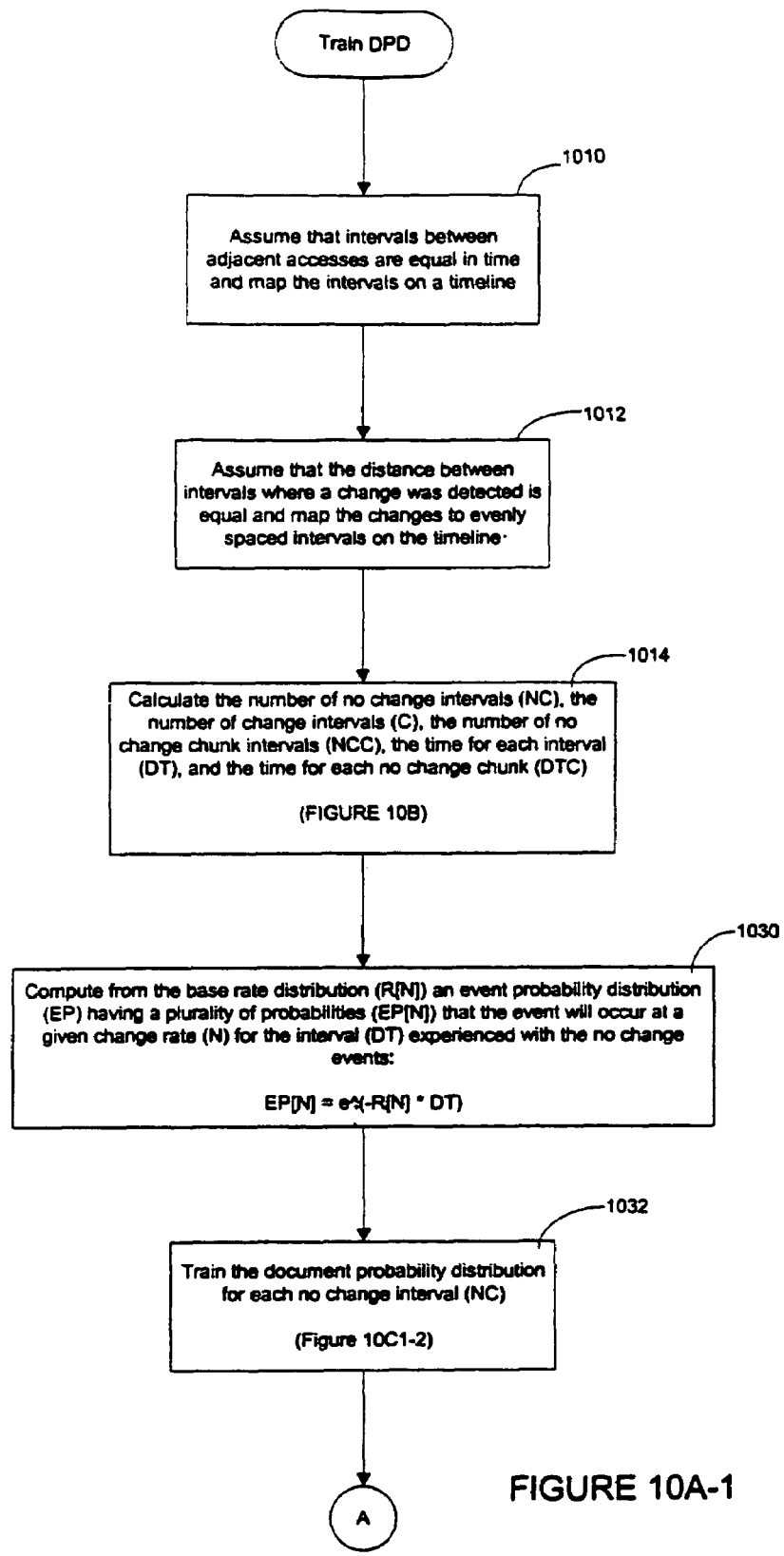
Figures 2, 10A:
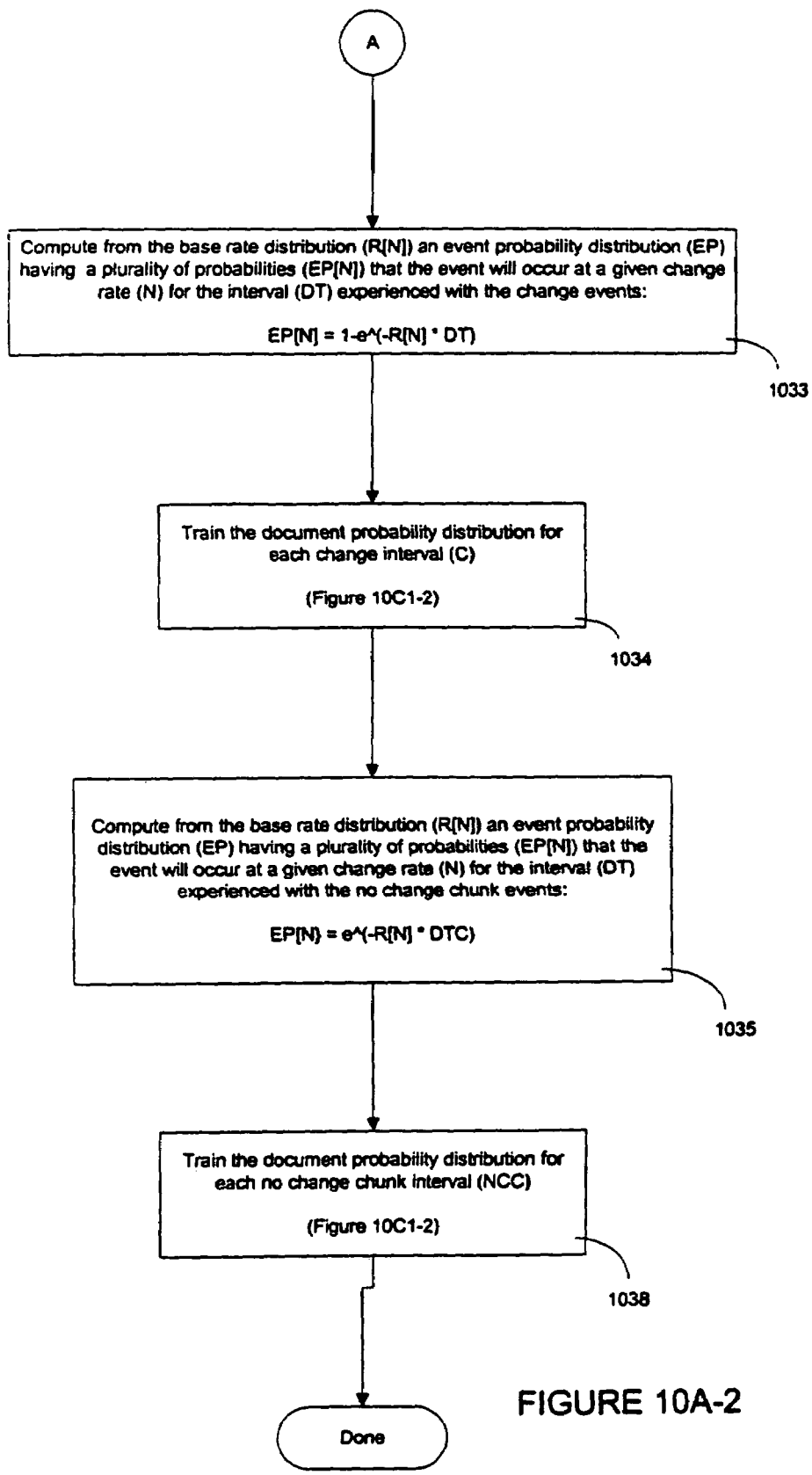
Figure 10B:
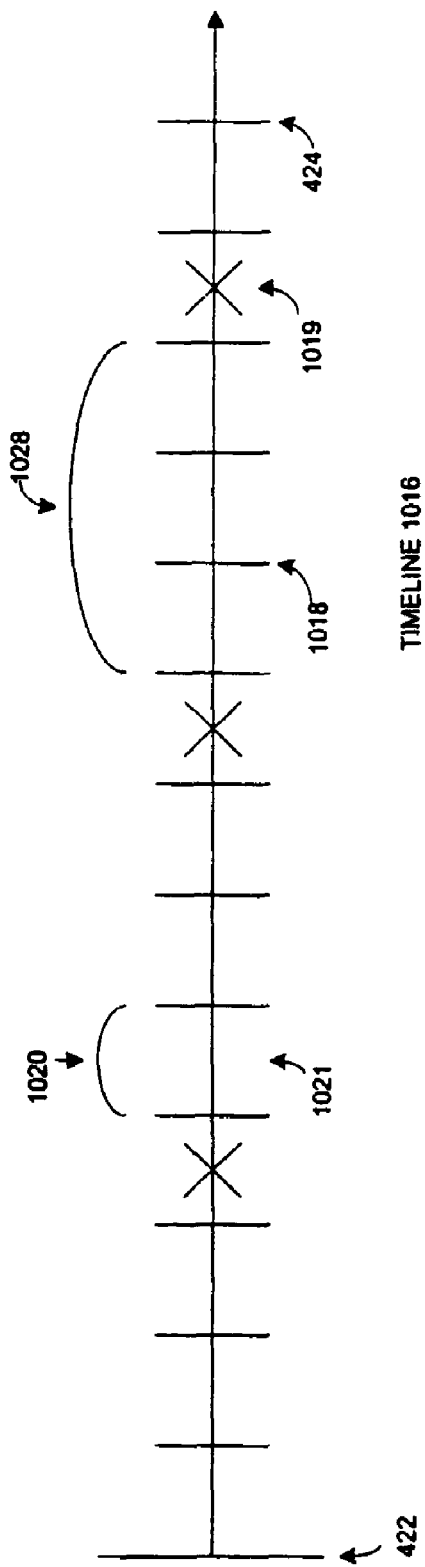
FIG. 10B is a pictorial illustration of a timeline used for mapping events used in the training of the document probability distribution, in accordance with an actual embodiment of the present invention.

FIG. 10A1-2 illustrate a process for training the document probability distribution. At step 1010, the accesses 428 to a document from history map 308 are mapped to a timeline. One example of such a timeline is illustrated in FIG. 10B and described below. Briefly described, the history map 308 contains the first access time 422, the last access time 424, the change count 426, and the access count 428 for each document identified in the history map 308. The timeline begins at the first access time 422 and ends at the last access time 424. The timeline is then divided into a number of uniform intervals equal to the number of accesses in the access count 428. The process then continues to step 1012.

At step 1012, the process assumes that the amount of time between each change (identified by the change count 426) is uniform. Thus, the changes are evenly distributed on the timeline. The information necessary for the application of the Poisson process can be derived from the mapping of the changes to the timeline. The process continues from step 1012 to step 1014.

At step 1014, several variables are calculated from the historical information in each entry 410 of history map 308 for use in the training of the document probability distribution. The average time between accesses (intervals) is computed and stored as the interval time (DT). The number of intervals between changes is calculated (NC). The number of intervals in which a change occurred is calculated (C). A group of intervals between changes is termed a "no change chunk." Accordingly, the number of no change chunks (NCC) is calculated. And, finally, the length of time of each no change chunk (DTC) is calculated.

An event probability distribution for a no change event is computed in a step 1030. The event probability distribution includes a plurality of probabilities (EP[N]) that the event will occur at a given change rate (N) for the interval (DT) experienced with the no change events. Each probability EP[N] is computed using the Poisson process: $EP[N]=e^{(-R[N]*DT)}$ where e is the transcendental constant used as the base for natural logarithms, R[N] is the rate of change and DT is the time interval of the event. At step 1032, the event probability distribution EP[N] calculated at step 1030 is passed to a process for training the document probability distribution for the no change events. The operations performed by the process to train the document probability distribution for each no change event are illustrated in detail in FIG. 10C1-2 and described below.

At a step 1033, an event probability distribution for a change event is computed. The event probability distribution includes a plurality of probabilities (EP[N]) that the event will occur at a given change rate (N) for the interval (DT) experienced with the change events. Each probability EP[N] is computed using the Poisson process: $EP[N]=1-e^{(-R[N]*DT)}$. Alternatively, the event probability distribution may be calculated by taking the complement of each probability in the event probability distribution calculated for the no change events (as calculated in step 1030). At step 1034, the event probability distribution EP[N] calculated at step 1033 is passed to a process for training the document probability distribution for the change events. As mentioned above, the operations performed by the process to train the document probability distribution are illustrated in detail in FIG. 10C1-2 and described below.

At a step 1035, an event probability distribution for a no change chunk event is computed. The event probability distribution includes a plurality of probabilities (EP[N]) that the no change chunk event will occur at a given change rate (N) for the interval (DTC) interpolated for the no change chunk events. Each probability EP[N] is computed using the Poisson process: $EP[N]=e^{(-R[N]*DTC)}$. At step 1034, the event probability distribution EP[N] calculated at step 1035 is passed to a process for training the document probability distribution for the no change chunk events, as illustrated in detail in FIG. 10C1-2.

In summary, at step 1032, the document probability distribution is trained for each no change interval. At step 1034, the document probability distribution is trained for each change interval. And at step 1038, the document probability distribution is trained for each no change chunk interval. The order that the events/intervals are trained in steps 1032, 1034, and 1038 is believed to be immaterial. Once the document probability distribution is completely trained, the process of FIG. 10A is done at step 1040. Those skilled in the art will appreciate that alternative statistical models may be employed to train the document probability distribution without deviating from the spirit of the invention.

FIG. 10B is a graphical representation of a timeline 1016 constructed in accordance with the process of FIG. 10A. Each pair of adjacent accesses 918 define an interval 1020. The time of the first access, as stored in the history map 308, defines the first access time 422. The time of the last access, as stored in the history map 308, defines the last access time 424. The total access time (DTT) is the difference in time between the last access time 424 and the first access time 422. An average interval time DT is calculated by dividing the total number of intervals into the total access time DTT. Under the assumption that the changes recorded in the change count 426 occur at equal intervals during the accesses 1018, exemplary three changes 1019 are evenly distributed among the intervals on the timeline 1016.

In general, an interval 1020 that does not contain a change event 1019 is considered to contain a no change event 1021. Since a longer interval period has a significant effect on the probability calculated by the Poisson equation, no change intervals occurring between adjacent change intervals may be grouped into "no change chunks" 1028. A no change chunk 1028 is a group of no change intervals, which may be used to calculate a chunk time interval (DTC). In cases where there is a remainder of no change intervals which cannot be evenly placed into a no change chunk 1020, the remainder intervals are treated as no change intervals 1021 and are used to train the document probability distribution separately. It should be appreciated that although one actual embodiment is described here for mapping events onto a timeline, there are many other, equally acceptable ways for mapping events onto a timeline. Accordingly, the present invention is not limited to the specific examples described here.

Figures 1, 10C:
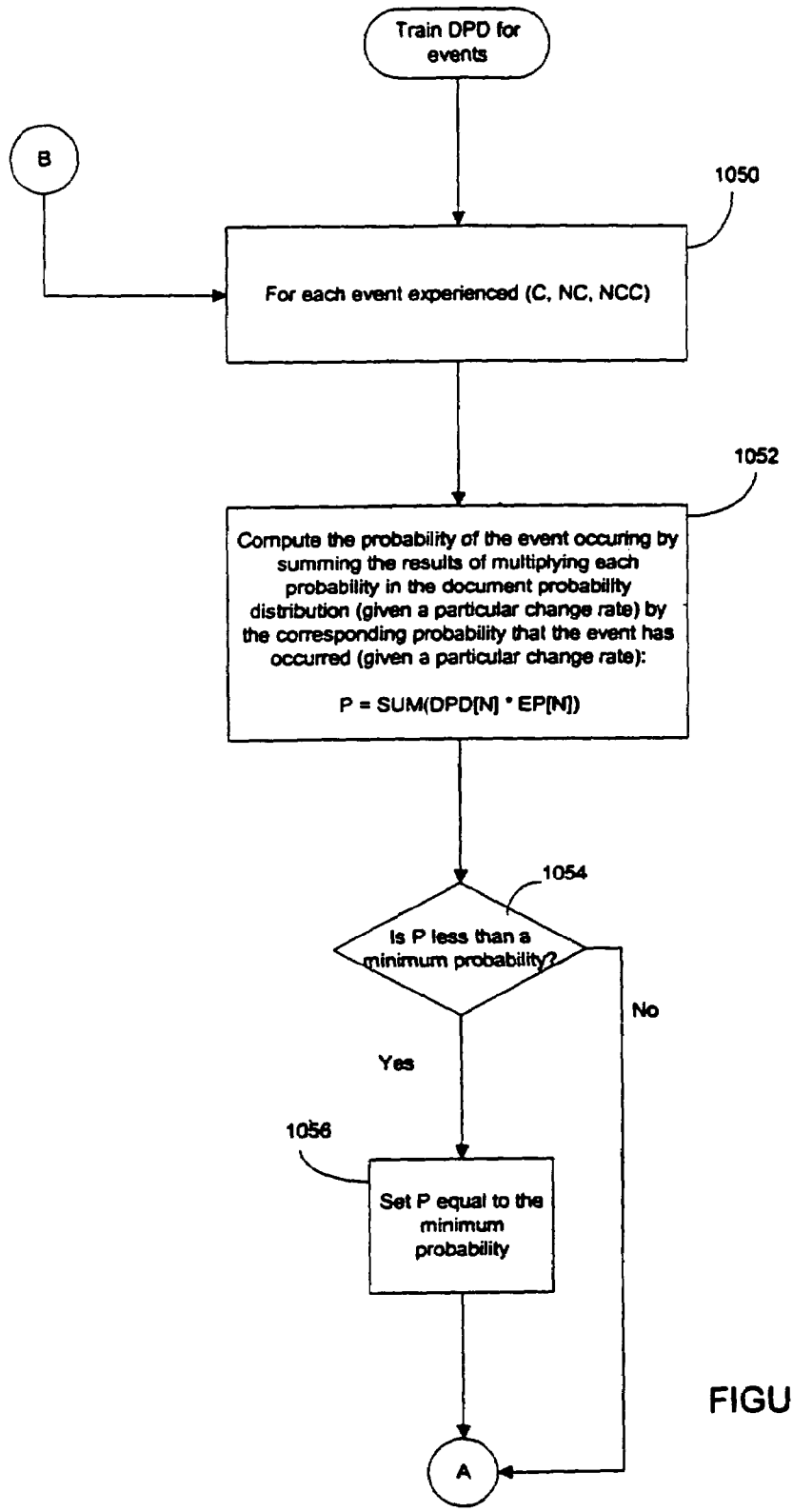
Figures 2, 10C:
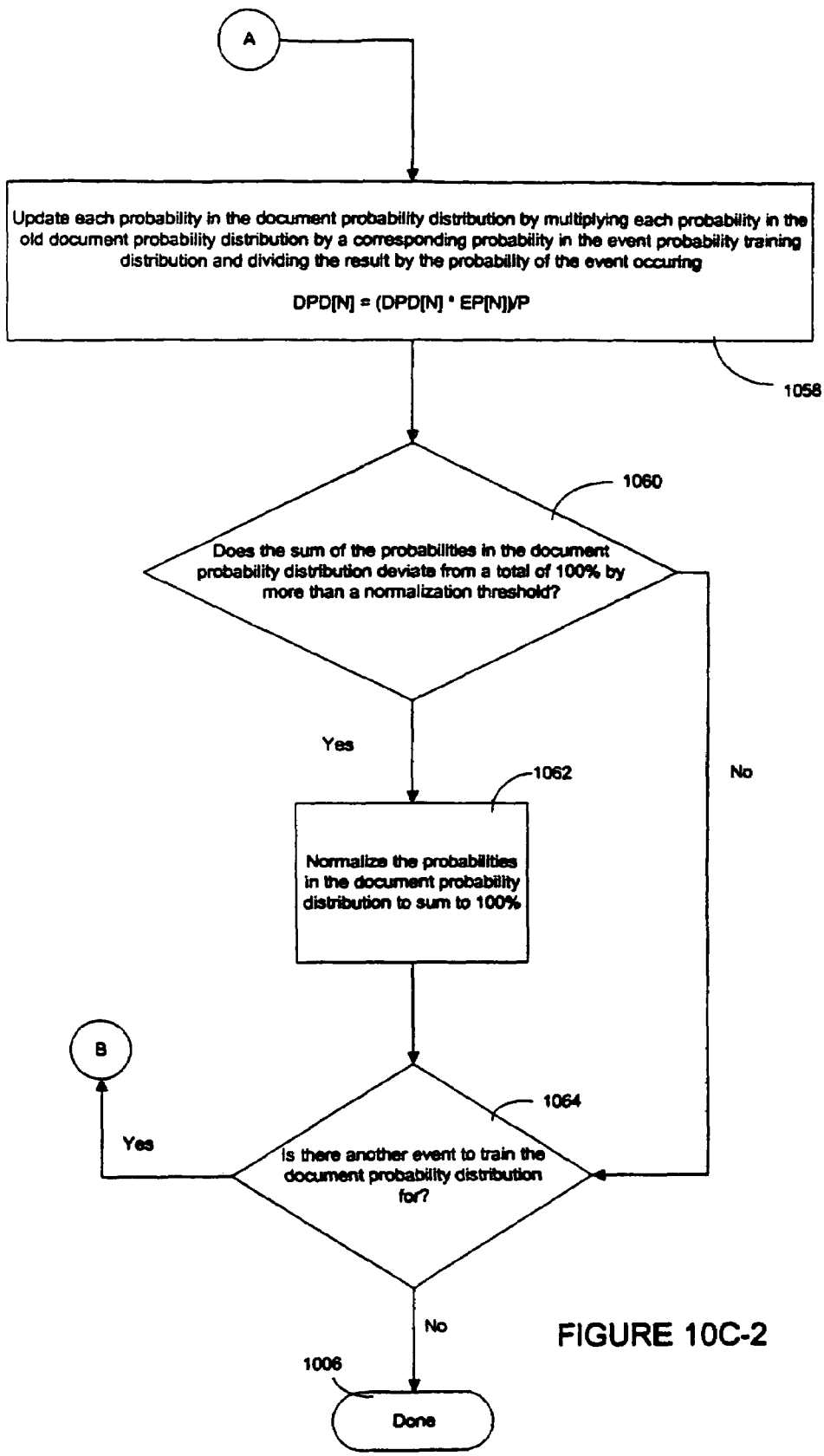

FIGS. 10C1-2 illustrate one exemplary process for training the document probability distribution for occurrence of an event for each passed event type (e.g., no change event, change event and no change chunk event). Beginning with step 1050, each occurrence of an event type (e.g., C, NC, NCC) is trained. At step 1052, the probability of the event occurring is computed by summing the results of multiplying each probability in the document probability distribution (given a particular change rate) by the corresponding probability that the event has occurred (given a particular change rate): i.e., $P=SUM(DPD[i]*EP[i])$. This probability P is checked against a minimum probability constant that is set by the system administrator. If the probability P is less than the minimum probability value, a decision step 1054 directs the process to set P to the minimum probability value in a step 1056.

Once checked by decision step 1054 and the value of P reset, if necessary, each probability in the document probability distribution is updated by multiplying each probability in the (old) document probability distribution by a corresponding probability in the event probability training distribution and dividing the result by the probability of the event occurring, i.e., DPD[N]=(DPD[N]*EP[N])/P.

The document probability distribution resulting from step 1058 is checked in a decision step 1060 for an adequate normalization, by determining if the sum of the probabilities in the document probability distribution deviate from a total of 100% by more than a predetermined normalization threshold constant. If the normalization threshold constant is exceeded, the document probability distribution is normalized in a step 1062.

At a step 1064, if there is another event to train the document probability distribution for, the process control is passed back to step 1050 (FIG. 10C-1). When all events have been trained for, the process is done 1066.

Figure 11:
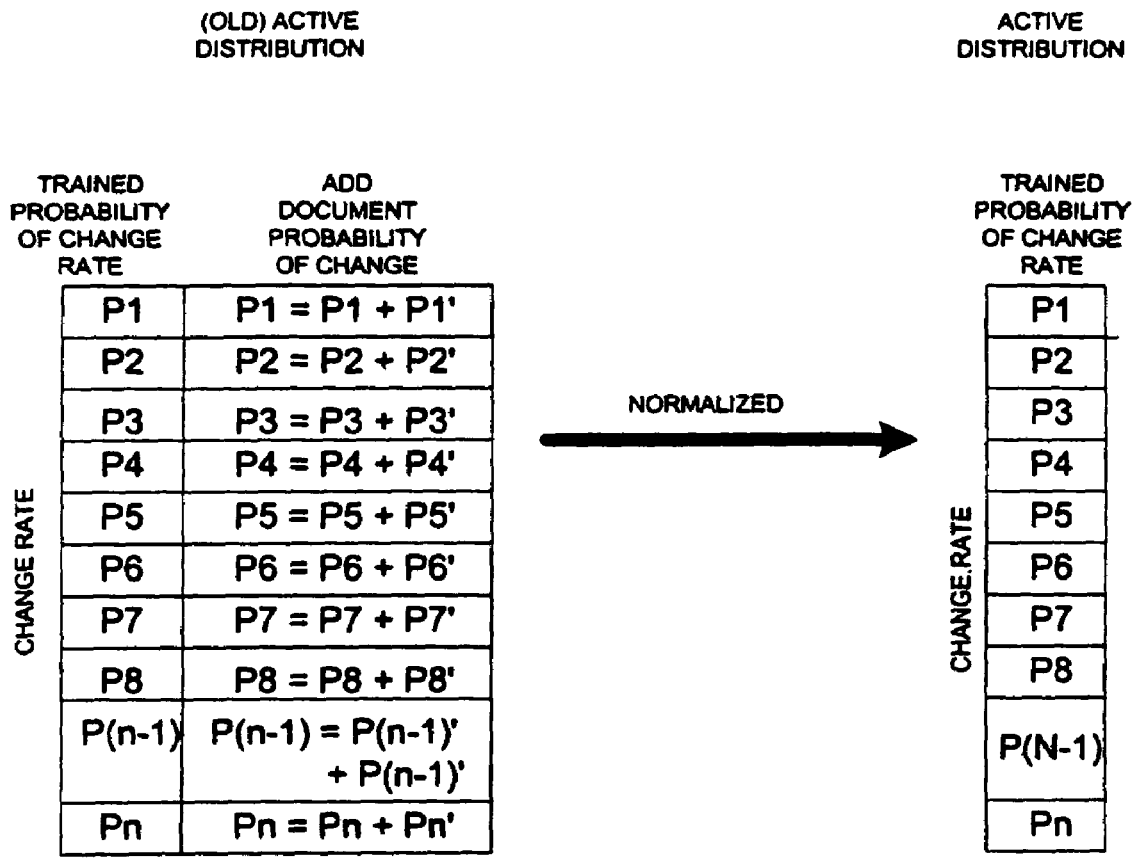
FIG. 11 is a block diagram illustrating the process of accumulating a training probability distribution in accordance with the present invention.

FIG. 11 illustrates the update of the training probability distribution 1110. As described above with reference to FIG. 7, initially, the training probability distribution is copied from the base probability distribution and multiplied by a very small diversity constant that essentially sets the elements of the training probability distribution to zero. During operation of proxy server 206, after a document probability distribution is calculated, the probability (Pn') in the document probability distribution is added to a corresponding probability (Pn) in the training probability distribution 1110. In this way, the training probability distribution aggregates the experience with all the document probability distributions calculated over successive document retrievals. Periodically, active probability distribution 306 is set equal to the training probability distribution 1110. This may be done every day, week, or any other time period. The active probability distribution thereby incorporates all of the training received from previous document retrievals.

Thus, as described above, the present invention provides systems and methods for determining whether to retrieve a document from cache or to re-fetch the document across a network. The systems and methods employ a statistical model and data collected from past retrievals to adaptively decide whether or not to re-fetch a document. These aspects of the invention provide for a proxy server that is faster and more efficient than existing systems.

Those skilled in the art understand that computer readable instructions for performing the above described processes can be generated and stored on a computer readable medium such as a magnetic disk or CD-ROM. Further, a computer such as that described with reference to FIG. 1 may be arranged with other similarly equipped computers in a network, and each computer may be loaded with computer readable instructions for performing the above described is processes. Specifically, referring to FIG. 1, microprocessor 21 may be programmed to operate in accordance with the above-described processes.

While the invention has been described and illustrated with reference to specific embodiments, those skilled in the art will recognize that modification and variations may be made without departing from the principles of the invention as described above and set forth in the following claims. In particular, the invention may be employed in virtually any situation wherein it is necessary to either retrieve a document from cache or from another location. Further, while the invention has been described with reference to a Poisson distribution, other statistical models might also be used. Accordingly, reference should be made to the appended claims as indicating the scope of the invention.

What is claimed is:

1. A computer-readable medium storing computer-executable instructions for retrieving one document in a plurality of documents from either a remote server or a local cache, the one document having been previously retrieved from the remote server and a copy thereof stored in the cache, that, when executed, comprise:

Maintaining historical information representing prior changes to the one document; the historical information representing prior changes to the one document comprises for one document, a change count representing the number of times the one document has been modified, an access count representing the number of times the one document has been retrieved from the remote server, a first access time representing the time the one document was first retrieved from the remote server, and a last access time representing the time the one document was last retrieved from the remote server;

Initiating a document retrieval request procedure for retrieving particular documents in the plurality of documents;

Determining whether to access the one document from the remote server or the local cache, wherein the determination is based on a probabilistic analysis of the historical information representing prior changes to the one document, wherein the probabilistic analysis comprises: Computing a probability that the one document has changed since the one document was last retrieved from the remote server, the probability that the one document has changed since the document was last retrieved from the remote server being computed without examining the one document and Beginning with a probability that a pre-defined proportion of documents in the plurality of documents has changed, training the probability that the pre-defined proportion of documents has changed using the historical information representing prior changes to the one document to achieve the probability that the one document has changed; Wherein the step of training the probability comprises: creating a timeline using the historical information, the timeline having representations thereon of no change intervals, change intervals, and no change chunk intervals; Training the document probability distribution for each no change interval; Training the document probability distribution for each change interval; and Training the document probability distribution for each no change chunk interval.

2. The computer-readable medium of claim 1, further comprising:

If the determination to access the one document is positive, identifying the one document for retrieval from the cache during the document retrieval procedure.

3. The computer-readable medium of claim 1, further comprising making a random decision to retrieve the one document wherein the random decision is biased by the probability that the one document has changed.

4. The computer-readable medium of claim 3, wherein the random decision is further biased by a synchronization level configured to influence the random decision based on a predetermined degree of tolerance for not retrieving the one document if the document is likely to have changed.

5. The computer-readable medium of claim 3, wherein the random decision is made by a software routine adapted to simulate a flip of a coin.

6. The computer-readable medium of claim 1, wherein:
The historical information representing prior changes to the one document includes a hash value associated with the one document, the hash value being a representation of the one document; and
The probabilistic analysis includes a comparison of the hash value included in the historical information with another hash value calculated from information retrieved from the one document stored on the remote server each time the one document is retrieved from the remote server.

7. The computer-readable medium of claim 6, wherein if the hash value included in the historical information does not match the other hash value associated with the one document stored on the remote server, updating the historical information to denote that the one document has changed.

8. A computer-implemented method for retrieving one document in a plurality of documents from either a remote server or a local cache, the one document having been previously retrieved from the remote server and a copy thereof stored in the cache, the method comprising:
Maintaining historical information representing prior changes to the one document; the historical information representing prior changes to the one document comprises for one document, a change count representing the number of times the one document has been modified, an access count representing the number of times the one document has been retrieved from the remote server, a first access time representing the time the one document was first retrieved from the remote server, and a last access time representing the time the one document was last retrieved from the remote server; Initiating a document retrieval request procedure for retrieving particular documents in the plurality of documents; and
Determining whether to access the one document from the remote server or the local cache, wherein the determination is based on a probabilistic analysis of the historical information representing prior changes to the one document, wherein the probabilistic analysis comprises:
Computing a probability that the one document has changed since the one document was last retrieved from the remote server, the probability that the one document has changed since the document was last retrieved from the remote server being computed without examining the one document and
Beginning with a probability that a pre-defined proportion of documents in the plurality of documents has changed, training the probability that the pre-defined proportion of documents has changed using the historical information representing prior changes to the one document to achieve the probability that the one document has changed; Wherein the step of training the probability comprises: creating a timeline using the historical information, the timeline having representations thereon of no change intervals, change intervals, and no change chunk intervals; Training the document probability distribution for each no change interval; Training the document probability distribution for each change interval; and Training the document probability distribution for each no change chunk interval.

9. The method of claim 8, further comprising:
If the determination to access the one document is positive, identifying the one document for retrieval from the cache during the document retrieval procedure.

10. The method of claim 8, further comprising making a random decision to retrieve the one document wherein the random decision is biased by the probability that the one document has changed.

11. The method of claim 10, wherein the random decision is further biased by a synchronization level configured to influence the random decision based on a predetermined degree of tolerance for not retrieving the one document if the document is likely to have changed.

12. The method of claim 10, wherein the random decision is made by a software routine adapted to simulate a flip of a coin.

13. The method of claim 8, wherein:
The historical information representing prior changes to the one document includes a hash value associated with the one document, the hash value being a representation of the one document; and
The probabilistic analysis includes a comparison of the hash value included in the historical information with another hash value calculated from information retrieved from the one document stored on the remote server each time the one document is retrieved from the remote server.

14. The method of claim 13, wherein if the hash value included in the historical information does not match the other hash value associated with the one document stored on the remote server, updating the historical information to denote that the one document has changed.

15. A system for retrieving one document in a plurality of documents from either a remote server or a local cache, the one document having been previously retrieved from the remote server and a copy thereof stored in the cache, the system comprising:
a processor; and a memory having computer-executable instruction stored thereon, the computer-executable instructions including instructions for:
Maintaining historical information representing prior changes to the one document; the historical information representing prior changes to the one document comprises for one document, a change count representing the number of times the one document has been modified, an access count representing the number of times the one document has been retrieved from the remote server, a first access time representing the time the one document was first retrieved from the remote server, and a last access time representing the time the one document was last retrieved from the remote server;
Initiating a document retrieval request procedure for retrieving particular documents in the plurality of documents; and
Determining whether to access the one document from the remote server or the local cache, wherein the determination is based on a probabilistic analysis of the historical information representing prior changes to the one document, wherein the probabilistic analysis: comprises: Computing a probability that the one document has changed since the one document was last retrieved from the remote server, the probability that the one document has changed since the document was last retrieved from the remote server being computed without examining the one document and
Beginning with a probability that a pre-defined proportion of documents in the plurality of documents has changed, training the probability that the pre-defined proportion of documents has changed using the historical information representing prior changes to the one document to achieve the probability that the one document has changed; Wherein the step of training the probability comprises: creating a timeline using the historical information, the timeline having representations thereon of no change intervals, change intervals, and no change chunk intervals; Training the document probability distribution for each no change interval; Training the document probability distribution for each change interval; and Training the document probability distribution for each no change chunk interval.

16. The system of claim 15, further comprising:

If the determination to access the one document is positive, identifying the one document for retrieval from the cache during the document retrieval procedure.

17. The system of claim 15, further comprising making a random decision to retrieve the one document wherein the random decision is biased by the probability that the one document has changed.

18. The system of claim 17, wherein the random decision is further biased by a synchronization level configured to influence the random decision based on a predetermined degree of tolerance for not retrieving the one document if the document is likely to have changed.

19. The system of claim 17, wherein the random decision is made by a software routine adapted to simulate a flip of a coin.

20. The system of claim 15, wherein:

The historical information representing prior changes to the one document includes a hash value associated with the one document, the hash value being a representation of the one document; and The probabilistic analysis includes a comparison of the hash value included in the historical information with another hash value calculated from information retrieved from the one document stored on the remote server each time the one document is retrieved from the remote server.

21. The system of claim 20, wherein if the hash value included in the historical information does not match the other hash value associated with the one document stored on the remote server, updating the historical information to denote that the one document has changed.

* * * * *